United States Patent
Tsuji et al.

(10) Patent No.: US 11,853,604 B2
(45) Date of Patent: Dec. 26, 2023

(54) COMPUTATIONAL STORAGE DEVICE, METHOD, AND DATA PROCESSING SYSTEM EXECUTING OPERATION IN ACCORDANCE WITH INFORMATION IN COMMAND

(71) Applicant: Kioxia Corporation, Tokyo (JP)

(72) Inventors: Ayako Tsuji, Yokohama (JP); Kazunari Sumiyoshi, Yokohama (JP)

(73) Assignee: Kioxia Corporation, Tokyo (JP)

( * ) Notice: Subject to any disclaimer, the term of this patent is extended or adjusted under 35 U.S.C. 154(b) by 40 days.

(21) Appl. No.: 17/473,437

(22) Filed: Sep. 13, 2021

(65) Prior Publication Data

US 2022/0300207 A1 Sep. 22, 2022

(30) Foreign Application Priority Data

Mar. 18, 2021 (JP) .................................. 2021-044768

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 10,394,746 B2 | 8/2019 | Kachare et al. | |
| 2013/0275652 A1* | 10/2013 | Simionescu | G06F 3/0679 710/5 |
| 2019/0042501 A1* | 2/2019 | Trika | G06F 13/28 |
| 2020/0050375 A1* | 2/2020 | Gole | G06F 3/064 |
| 2020/0201692 A1 | 6/2020 | Kachare et al. | |
| 2020/0301842 A1 | 9/2020 | Ohira et al. | |
| 2022/0188028 A1* | 6/2022 | Mesnier | G06F 3/067 |
| 2022/0197704 A1* | 6/2022 | Gibb | G06F 9/5088 |
| 2022/0229785 A1* | 7/2022 | Anchi | G06F 3/0647 |
| 2022/0405014 A1* | 12/2022 | Chesterfield | G06F 3/0619 |

FOREIGN PATENT DOCUMENTS

| | | |
|---|---|---|
| JP | 2019-75104 A | 5/2019 |
| JP | 2020-102218 A | 7/2020 |
| JP | 2020-154626 A | 9/2020 |

OTHER PUBLICATIONS

Mitra, T. (2016). Application-Specific Processors. In: Ha, S., Teich, J. (eds) Handbook of Hardware/Software Codesign. Springer, Dordrecht. https://doi.org/10.1007/978-94-017-7358-4_13-1.*

* cited by examiner

*Primary Examiner* — Tracy A Warren
(74) *Attorney, Agent, or Firm* — Oblon, McClelland, Maier & Neustadt, L.L.P.

(57) ABSTRACT

According to one embodiment, a computational storage device comprises a nonvolatile memory and a controller configured to control a data process including a first process and a second process. The first process writes data, designated by a first command received from an external device, to the nonvolatile memory. The second process reads data, designated by a second command received from the external device, from the nonvolatile memory and transmits read data to the external device. The controller comprises a processor configured to determine whether to perform the data process in accordance with information included in the first or second command.

15 Claims, 26 Drawing Sheets

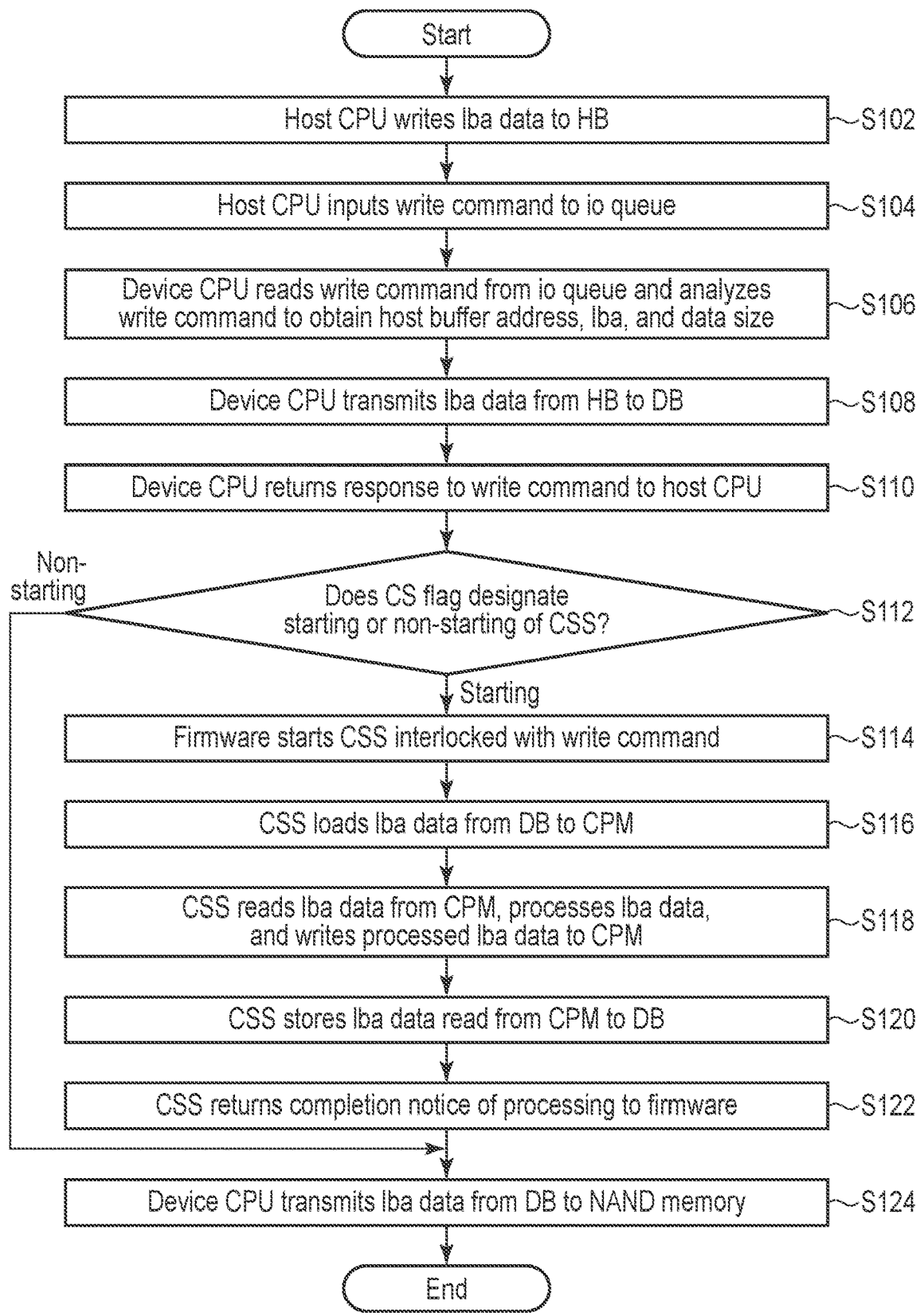
F I G. 2

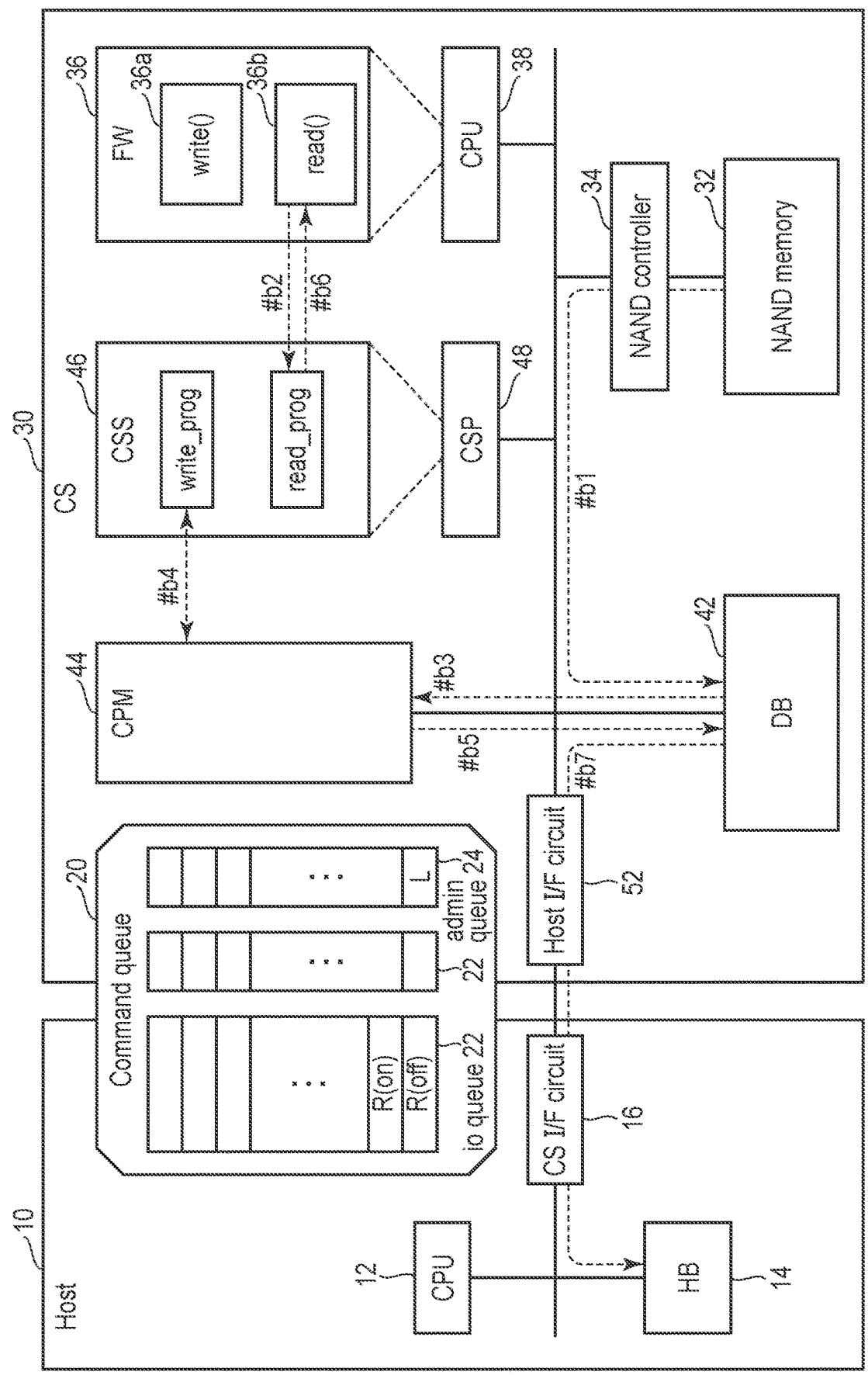
F I G. 3

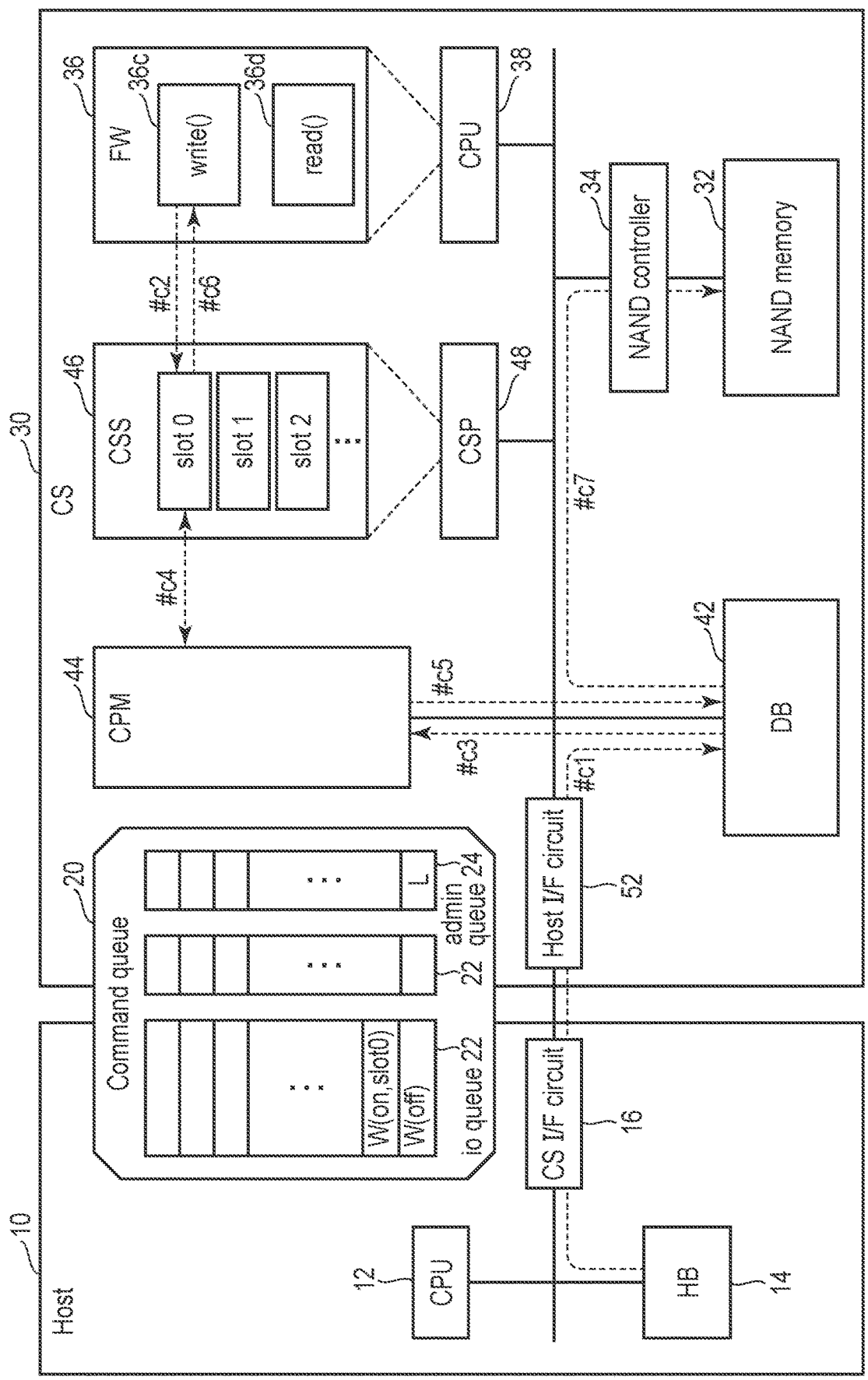
F I G. 5

22

| W(on,slot1,cpm_addr1) |
|---|
| W(on,slot0,cpm_addr0) |
| Tx(cpm_addr1) |
| Tx(cpm_addr0) |

F I G. 13A

22

| R(on,slot1,cpm_addr1) |
|---|
| R(on,slot0,cpm_addr0) |
| Tx(cpm_addr1) |
| Tx(cpm_addr0) |

F I G. 13B

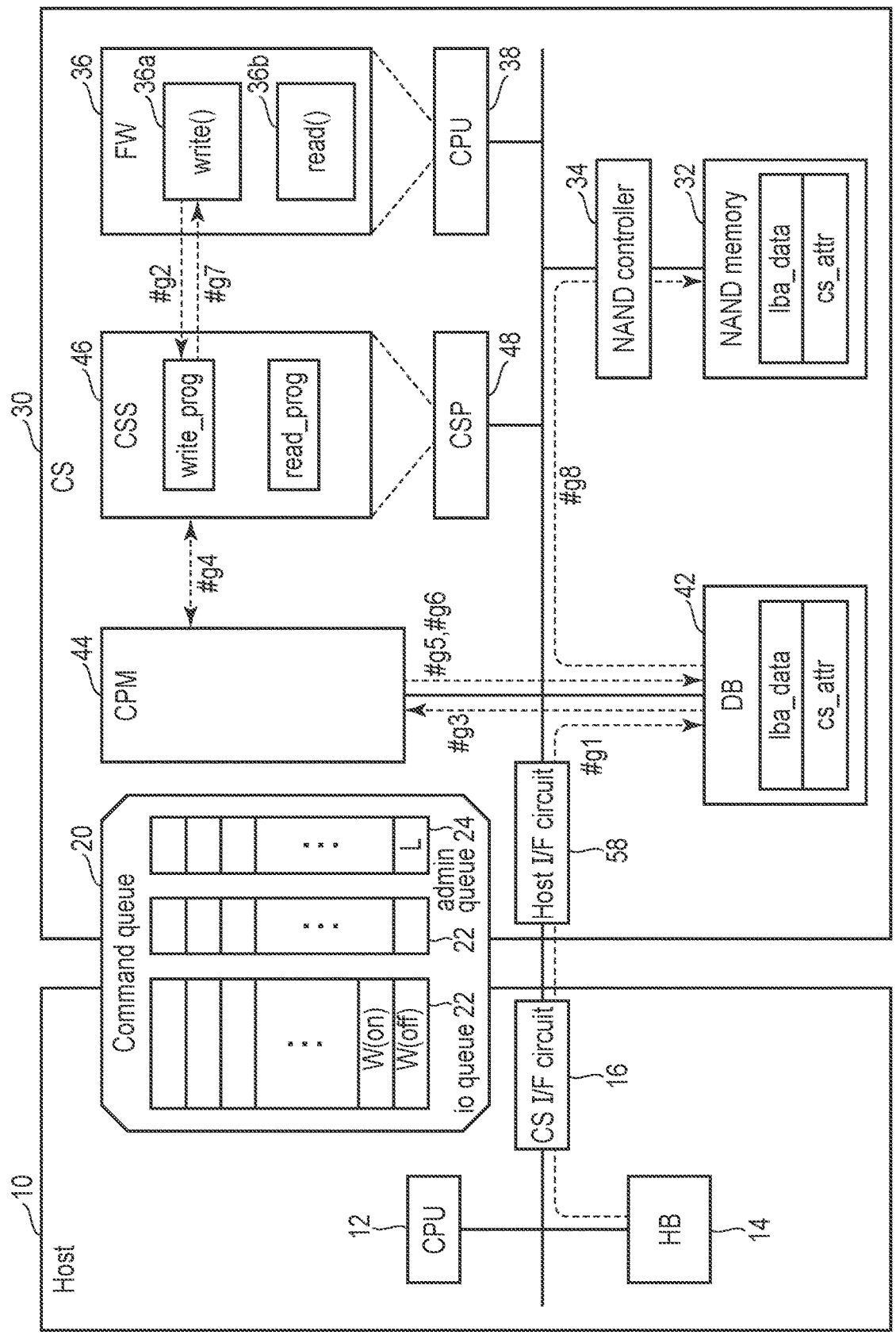
F I G. 14

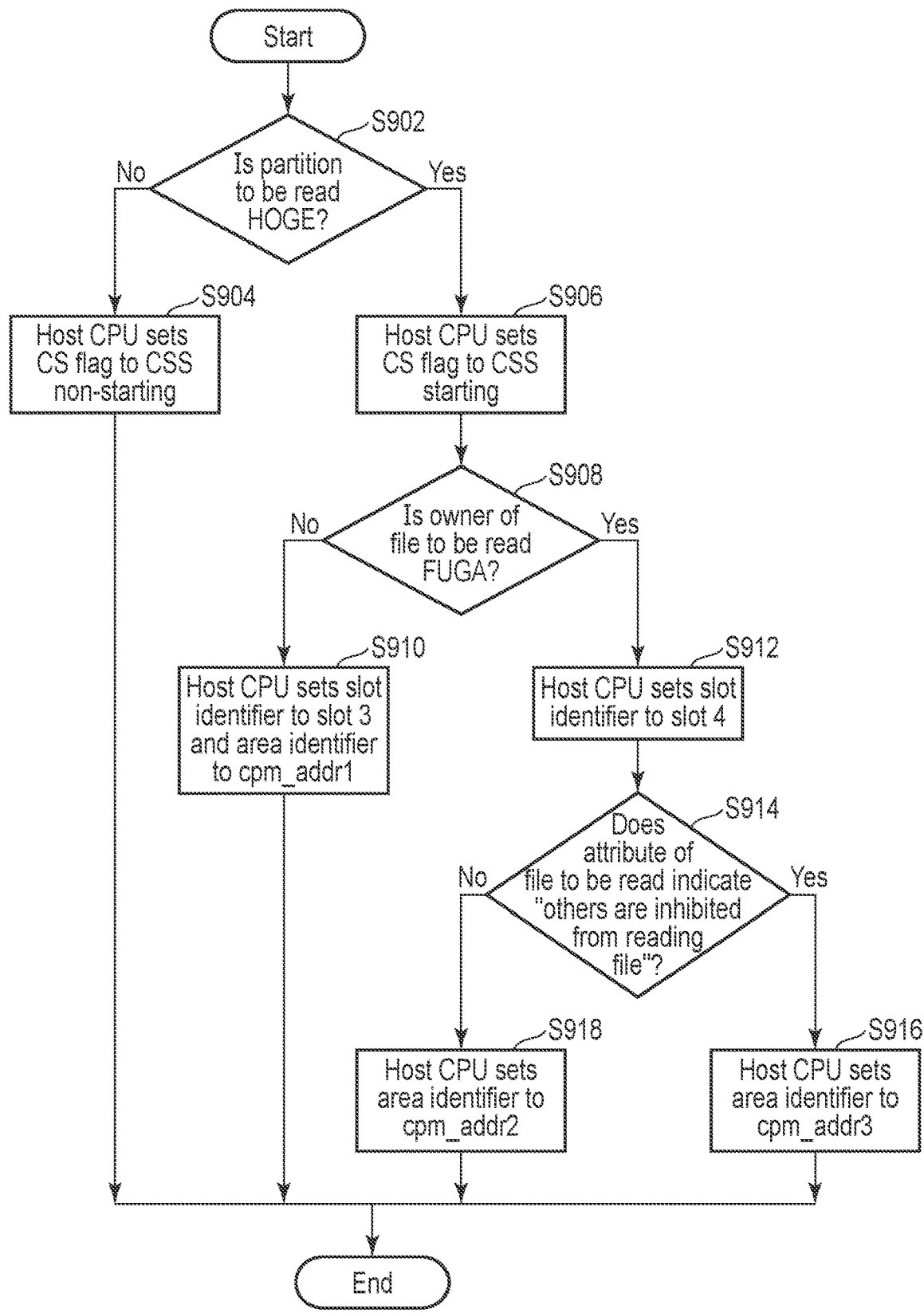
F I G. 19

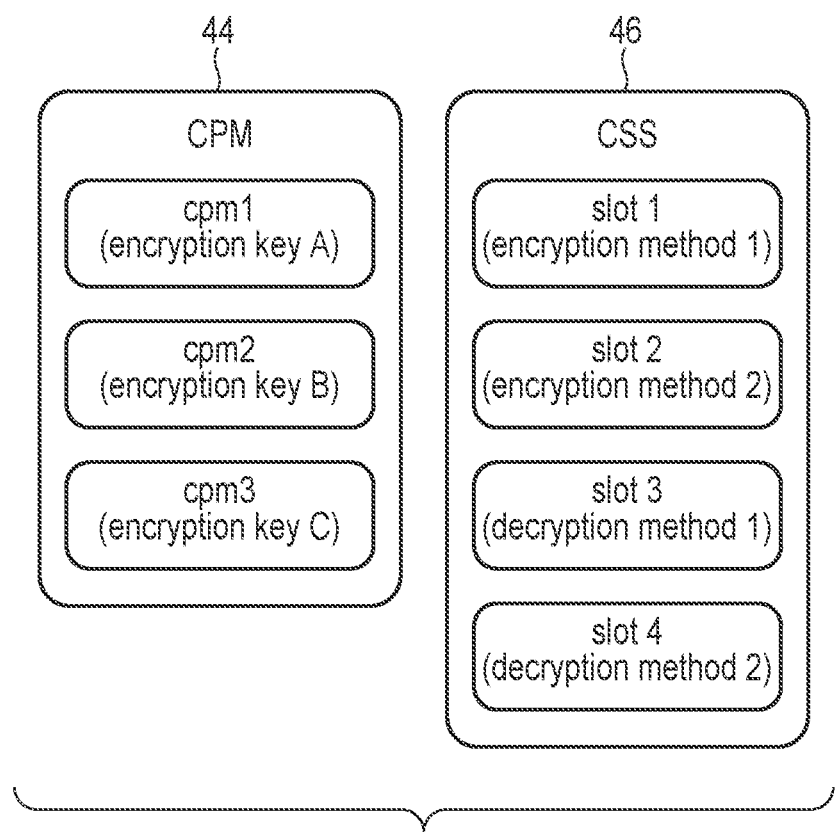
F I G. 20

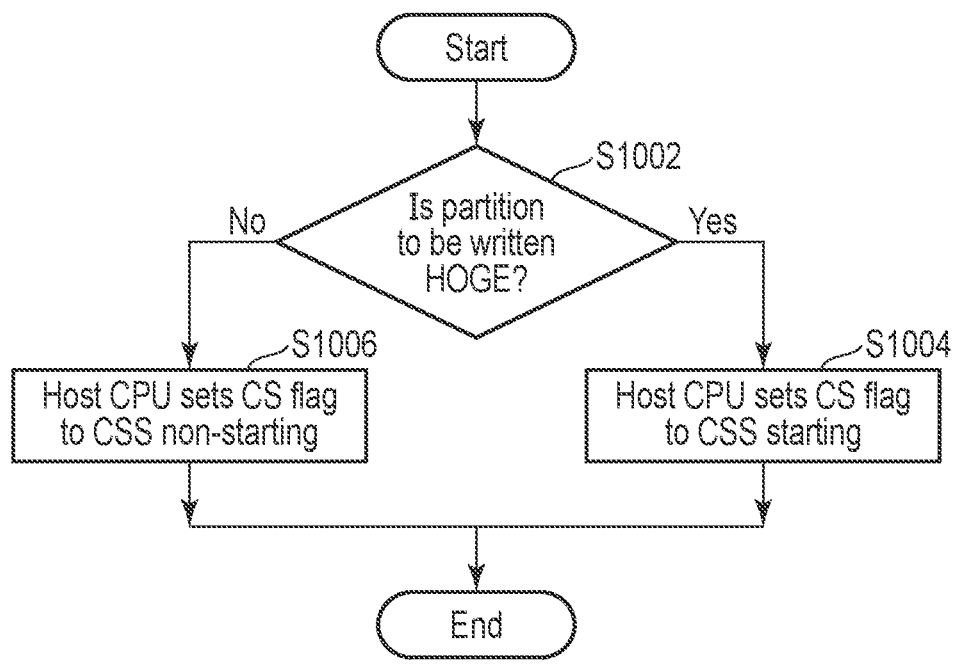
F I G. 21
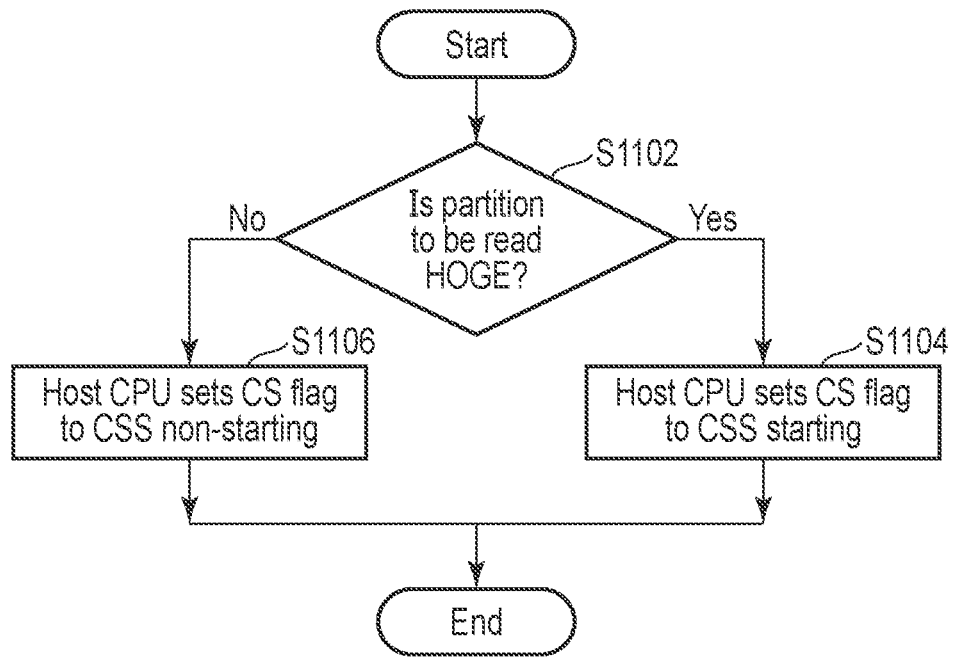
F I G. 22

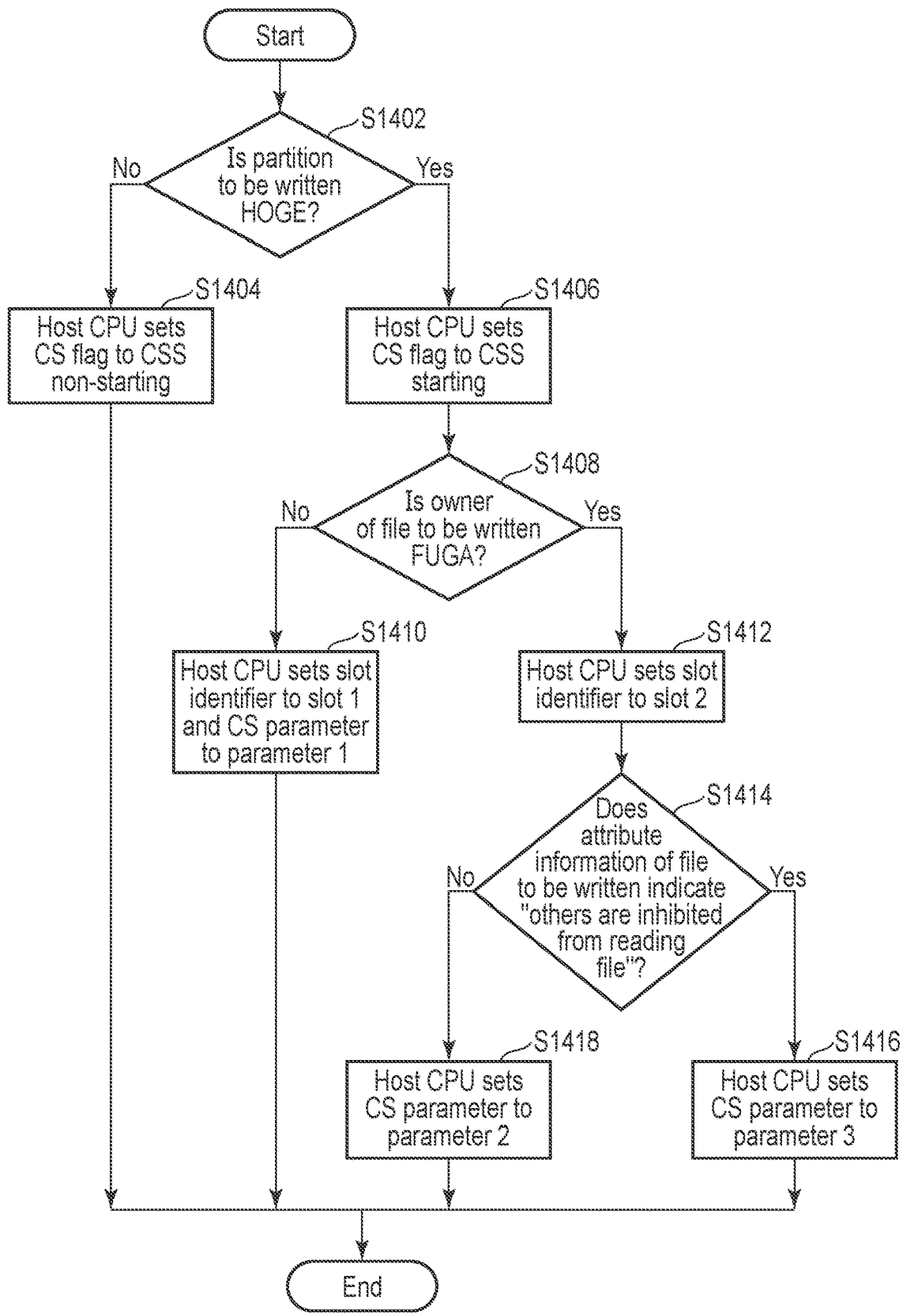
F I G. 25

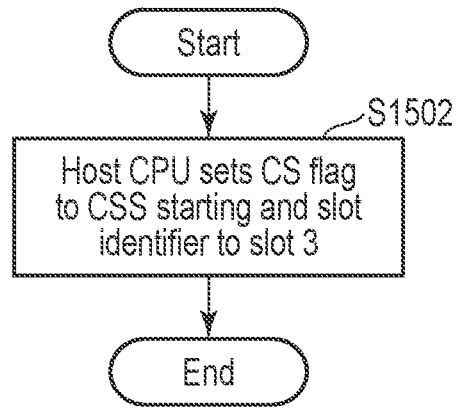
FIG. 26
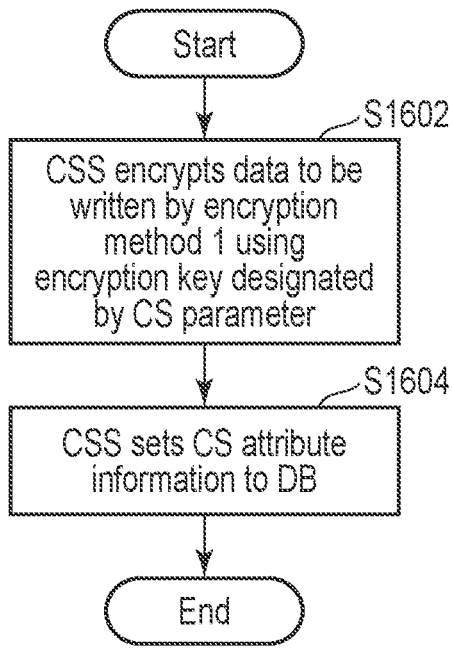 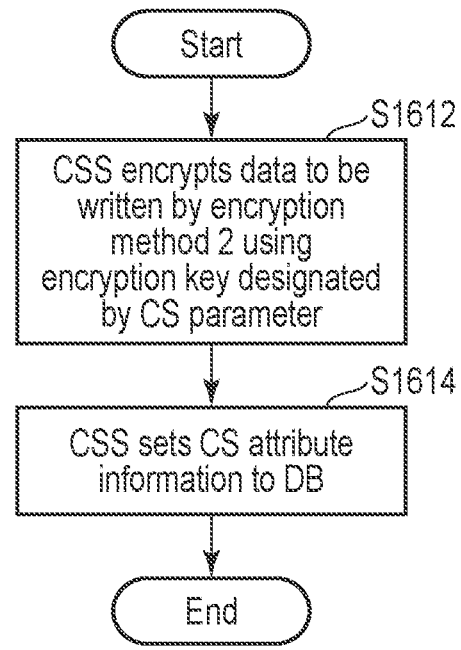
FIG. 27A          FIG. 27B

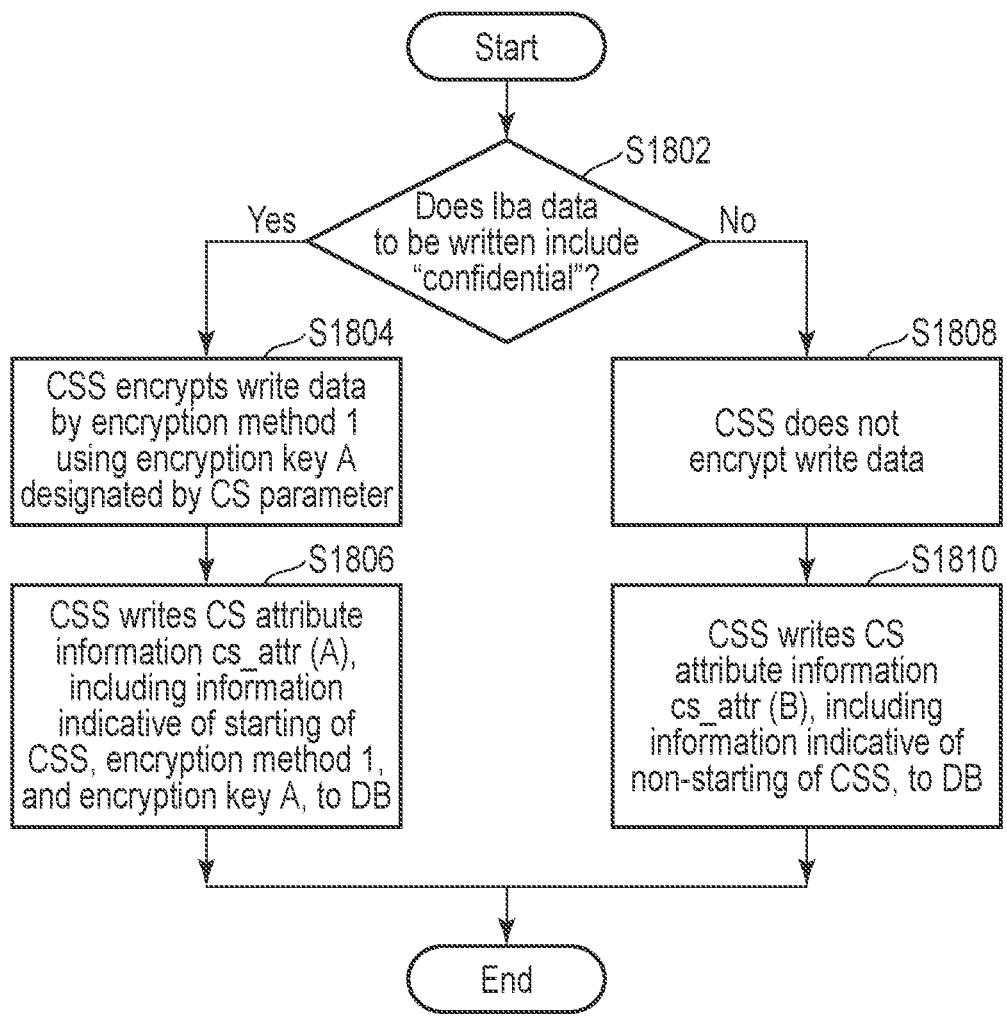
F I G. 29

COMPUTATIONAL STORAGE DEVICE, METHOD, AND DATA PROCESSING SYSTEM EXECUTING OPERATION IN ACCORDANCE WITH INFORMATION IN COMMAND

CROSS-REFERENCE TO RELATED APPLICATIONS

This application is based upon and claims the benefit of priority from Japanese Patent Application No. 2021-044768, filed Mar. 18, 2021, the entire contents of which are incorporated herein by reference.

FIELD

Embodiments described herein relate generally to a computational storage device including a nonvolatile memory, a method, and a data processing system.

BACKGROUND

A storage system including a memory system having a nonvolatile memory is developed. One example of the memory system is a computational storage device. The storage system includes a host and the memory system connected to the host and is implemented as a data processing system. In the data processing system, a method is proposed to reduce the load of a CPU provided in the host (also referred to as a host CPU) and to decrease the cost of data transfer across the host CPU and the memory system. For example, a method is proposed in which data is processed by not the host CPU but a dedicated processor placed inside or close to the memory system. This method is implemented by a configuration in which a computational function for data processing is provided inside or close to the memory system. The memory system adapted to this configuration is referred to as a storage with a computational function or a computational storage (CS). The service provided by the CS is referred to as a computational storage service (CSS).

As an example of a method for starting the CSS, there is a method for starting the CSS in conjunction with an io command such as a read command and a write command from the host to the CS. This method allows the CSS to start without the host detecting the starting of the CSS. The method however lacks flexibility.

BRIEF DESCRIPTION OF THE DRAWINGS

FIG. 2 is a flowchart for explaining an example of a process of the write operation according to the first embodiment.

FIG. 3 is a block diagram for explaining an example of a read operation of the CS of the data processing system according to the first embodiment.

FIG. 5 is a block diagram for explaining an example of a write operation of a CS of a data processing system according to a second embodiment.

FIGS. 13A and 13B respectively show examples of a command input to io queue by a host in a fourth embodiment.

FIG. 14 is a block diagram for explaining an example of a write operation of a CS of a data processing system according to a fifth embodiment.

FIG. 19 is a flowchart for explaining an example of a CS flag generation process in a read operation according to the sixth embodiment.

FIG. 20 shows an example of a computational program memory (CPM) and a computational storage service (CSS) according to the sixth embodiment.

FIG. 21 is a flowchart for explaining an example of a CS flag generation process in a write operation according to a seventh embodiment.

FIG. 22 is a flowchart for explaining an example of a CS flag generation process in a read operation according to the seventh embodiment.

FIG. 25 is a flowchart for explaining an example of a CS flag generation process in a write operation according to an eighth embodiment.

FIG. 26 is a flowchart for explaining an example of a CS flag generation process in a read operation according to the eighth embodiment.

FIGS. 27A and 27B are flowcharts for explaining a process of the CSS in a write operation according to the eighth embodiment.

FIG. 29 is a flowchart for explaining a process of the CSS in a write operation according to a modification of the eighth embodiment.

DETAILED DESCRIPTION

Figure 1:
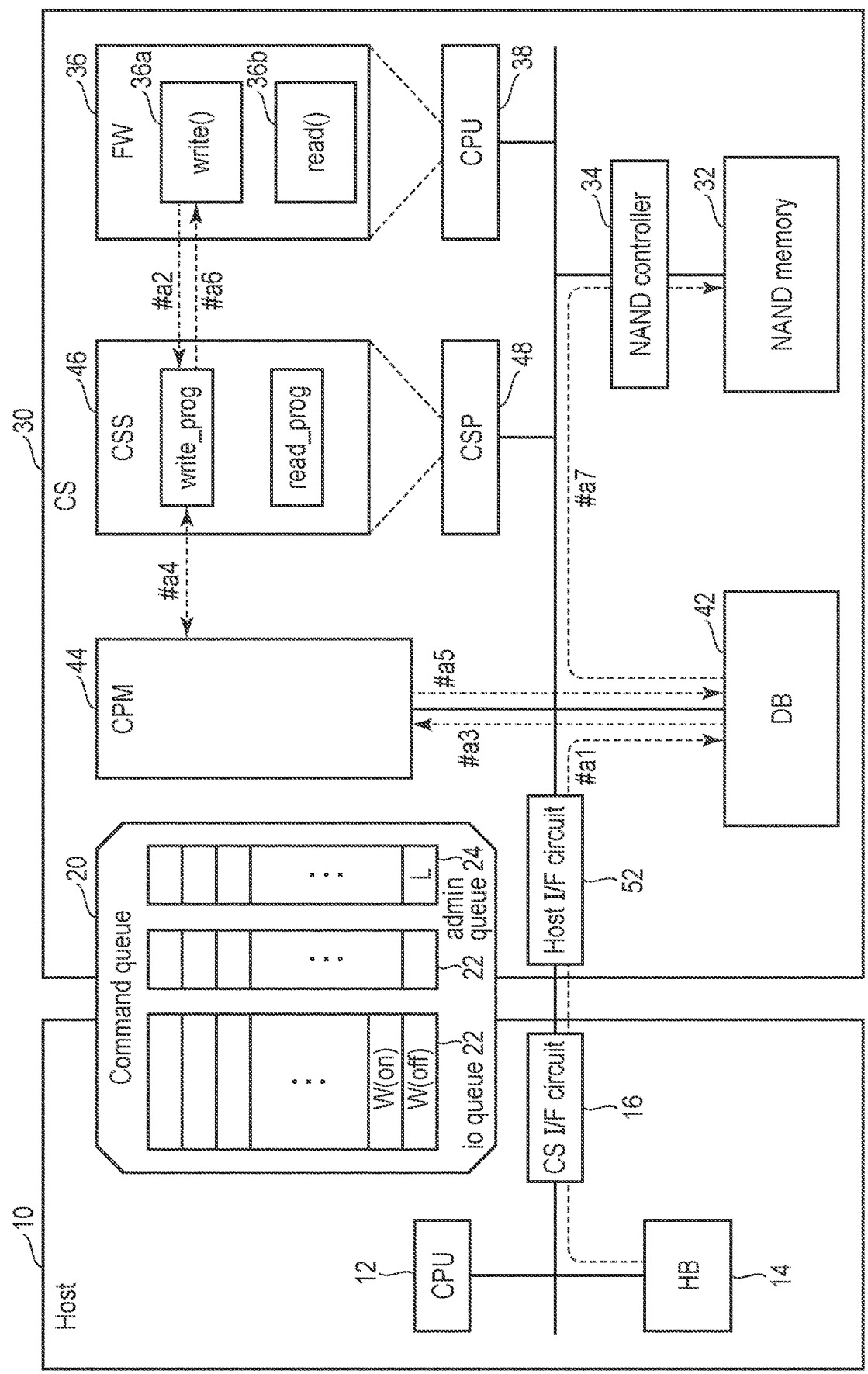
FIG. 1 is a block diagram for explaining an example of a write operation of a CS of a data processing system according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a computational storage device comprises a nonvolatile memory and a controller configured to control a data process including a first process and a second process. The first process writes data, designated by a first command received from an external device, to the nonvolatile memory. The second process reads data, designated by a second command received from the external device, from the nonvolatile memory and transmits read data to the external device. The controller comprises a processor configured to determine whether to perform the data process in accordance with information included in the first or second command.

The embodiments relate to an operation method of a computational storage (CS).

A variety of methods are proposed to implementations and provided services of the CS.

The storage networking industrial association (SNIA), which is a standardization promotion organization of storage networking, is trying to collect various information items on the CS and standardize the host interface of the CS based on classification, definition, and prioritization of the information items.

Refer to SNIA's idea, we describe the following two basic configurations of the CS.

CSx: Computational Storage Device (hardware configuration) CSS: Computational Storage Service (software configuration). A program that may be executed by a processor in a CSx.

There are a variety of types of CSx placement. In one type (CSP: computational storage processor), a processor that controls one or more storages is placed outside the storages and a host CPU is connected to the processor. In another type (CSD: computational storage drive), a storage drive that contains data storage and one or more processor(s) that execute(s) the CSS. In still another type (CSA: computational storage array), a storage array that contains multiple storage drive and one or more processor(s) that execute(s) the CSS.

In the embodiments, one example of placement type of a CSD incorporating a dedicated processor in a storage will be described. The embodiments are not limited to this placement type of the CSx and applicable to any type of placement. In the embodiments, a memory system will be described as an example of the storage. More specifically, in the following embodiments, a memory system will be described as an example of the computational storage device.

There are a variety of methods of implementing a processor for the CSS, such as a field programmable gate array (FPGA), a dedicated CPU, and a virtual CPU such as a Berkeley Packet Filter (BPF).

The embodiments are not limited to the processor implementation methods and can employ all of the methods listed here or other methods.

In this specification, a part of the processor for the CSS will be referred to as a computational storage processor (CSP) regardless of the placement or implementation of the CSx. The part is provided with a definition other than that of the computational storage processor described above.

The CSS is classified into the following two services.

(1) Fixed computational storage service (FCSS): a service that is defined fixedly in a device. Examples of the FCSS include compression, redundant arrays of inexpensive disks (RAID), erasure coding, encryption, etc.

(2) Programmable computational storage service (PCSS): a service that can be programmed by a host. The host creates a program and the storage downloads the program. Examples of the PCSS include an FPGA bit stream, a BPF, container, an OS loader, etc.

The embodiments can implement any of the CSS, and as an example, they are directed to BPF of the PCSS, FPBP bit stream, and a service group listed in the FCSS.

The range of use of CS architecture is as follows:
Management: discovery, configuration, or monitoring
Security: authentication, authorization, encryption, or auditing
Operation: definition of CSx data store and retrieval mechanism, or definition of action on the CSx from a host.

The embodiments relate to the operation among the above.

Note that a conventional storage with no computing function is referred to as a non-computational storage (NCS).

As an example of an operation method for the host to start the CSS provided by the CS, there are a direct operation method and a transparent operation method (also called an inline method).

In the direct operation method, an API dedicated to CSS control, which is different from the conventional API for storage control, such as a write command and a read command, is defined. The host can call the dedicated API to the CS to promote the CSS to start.

In the transparent operation method, the host can start the CSS through the conventional storage control API without detecting the starting of the CSS. The CSS is also started in conjunction with a write command and a read command issued from the host to the device.

The advantage of the direct operation method is that the host can start the service at a desired timing. The disadvantage of the direct operation method is that the host has to newly perform control that did not previously exist.

The advantage of transparent operation is that the host can start a service by simply executing a conventional program. The disadvantage of the transparent operation method is that it is not possible to perform detailed switching. Examples of detailed switching include starting or non-starting of the CSS according to conditions, selection of the type of the CSS to be started, setting of parameters necessary for starting the CSS, etc. The conditions include a condition for starting or non-starting the CSS and a condition for selecting a type of the CSS to be started. The host can define an optional condition.

In the transparent operation method, even though the CSS can be started or non-started, a type of the CSS to be started can be selected, and a parameter required to start the CSS can be set by any method, the following problems arise because there is no mechanism for associating attribute information with data.

For example, in order for the CSS to perform a process of encrypting user data received from the host, storing the encrypted user data into the storage, decrypting the data received from the storage, and transmitting the decrypted user data to the host, the host needs to separately manage attribute information indicating which data is encrypted by the CSS with which encryption key.

First Embodiment

The first embodiment proposes a CS of the transparent operation method in which an io command such as a write command and a read command includes a new CS flag including on information or off information that specifies the starting or the non-starting of the CSS.

FIG. 1 is a block diagram for explaining an example of a write operation of the CS of a data processing system according to a first embodiment.

A host 10 includes a CPU (also referred to as a host CPU) 12, a host buffer (HB) 14, and a CS I/F circuit 16. An example of the host buffer 14 is a DRAM or an SRAM. The CPU 12, the host buffer 14, and the CS I/F circuit 16 are connected to each other by a bus.

A CS 30 includes a nonvolatile memory 32, a memory controller 34, firmware (FW) 36, a CPU (also referred to as a device CPU) 38, a device buffer (DB) 42, a computational program memory (CPM) 44, a CSS 46, a CSP 48, and a host I/F circuit 52. The memory controller 34, CPU 38, device buffer 42, CPM 44, CSP 48, and host I/F circuit 52 are connected to each other by a bus.

The host 10 and the CS 30 can be connected to each other through the CS I/F circuit 16, a connection line, and the host I/F circuit 52. When the host 10 and the CS 30 are connected to each other, a command queue 20 is interposed between the host 10 and the CS 30 to transmit a request from the host 10 to the CS 30. The command queue 20 is implemented by a memory provided in one of the host 10 and CS 30. In accordance with the Non-Volatile Memory Express (NVMe)™ that is the SSD standard, the command queue 20 includes a plurality of io queues 22 and an admin (administrator) queue 24. As one example, two io queues 22 are shown in FIG. 1.

An example of the nonvolatile memory 32 is a NAND flash memory. The memory controller 34 is a circuit that controls data transfer to and from the nonvolatile memory 32. Hereinafter, the nonvolatile memory 32 will be referred to as a NAND memory 32, and the memory controller 34 will be referred to as a NAND controller 34. The firmware 36 that controls the entire CS 30 is stored in the NAND memory 32. The firmware 36 is written to a DRAM (not shown) when the CS 30 is powered on. The CPU 38 executes the firmware 36 in the DRAM. An example of the device buffer 42 is a DRAM or an SRAM.

The firmware 36 includes a firmware 36a and a firmware 36b. The firmware 36a is a program to check a CS flag of the write command and perform a determination process of starting a CSS in conjunction with the write command if the CS flag includes the on information that designates the starting of the CSS 46. An example of the firmware 36a is shown below.

```
write ( ) {
  if (CS_flag.CSS == on) {
    start (write_prog);
    wait (CSS_finish);
  }
}
```

The firmware 36b is a program to check a CS flag of the read command and perform a determination process of starting a CSS in conjunction with the read command if the CS flag includes the on information that designates the starting of the CSS 46. An example of the firmware 36b is shown below.

```
read ( ) {
  if (CS_flag.CSS == on) {
    start (read_prog);
    wait (CSS_finish);
  }
}
```

The CSS 46 may be a program incorporated in advance in the CS 30, or a program created in advance by the host 10 and loaded to the CS 30 by executing a CSS load command from the host 10.

The CSP 48 is a processor that executes the CSS 46.

The CPM 44 indicates a memory area that is accessible by the CSS 46. An example of the CPM 44 is a DRAM or an SRAM.

The CS 30 is also referred to as a solid state drive (SSD). The CS 30 may be referred to as a hard disk drive (HDD). If the CS 30 is HDD, the nonvolatile memory 32 will be referred to as a magnetic disk, and the memory controller 34 will be referred to as a disk controller.

It is assumed in the present specification that the CSS 46 is a program created in advance by the host 10 and loaded to the CS 30 by executing a CSS load command by the CS 30. The host 10 thus inputs a CSS load command L to the admin queue 22 before the host 10 inputs a write command W to the io queue 24. When the CS 30 executes the CSS load command L, the host 10 loads a program write_prog in conjunction with the write command and a program read_prog in conjunction with the read command to the CS 30. An example of the program write_prog is to encrypt data and to write the encrypted data to the NAND memory 32. An example of the read_prog program is to read data from the NAND memory 32 and to decrypt the read data. The program write_prog is in conjunction with the firmware 36a.

The program read_prog is in conjunction with the firmware 36b.

FIG. 2 is a flowchart showing an example of a process of a write operation according to the first embodiment.

In S102, the CPU (host CPU) 12 of the host 10 writes logical block address data (referred to as lba data hereinafter) to the host buffer 14.

In S104, the CPU 12 inputs write commands W(off) and/or W(on) to the io queue 22. Each of the write commands W(off) and W(on) includes an address (referred to as a host buffer address hereinafter) of an area of the host buffer 14 which stores lba data, an lba, and a data size. The write command W(off) is a write command W to which a CS flag including off information designating the non-starting of the CSS 46 is added. The write command W(on) is a write command W to which a CS flag including on information designating the starting of the CSS 46 is added.

In S106, the CPU (device CPU) 38 of the CS 30 that executes the firmware 36 reads the write command W from the io queue 22 and analyzes the write command W to obtain the host buffer address, the lba, and the data size.

In S108, based on a result of the analysis, the CPU 38 transmits the lba data from the host buffer 14 to the device buffer 42 (#a1 in FIG. 1).

In S110, the CPU 38 returns a response to the write command W to the CPU 12 of the host 10.

In S112, the CPU 38 determines whether the CS flag designates the starting or the non-starting of the CSS 46 (CSS 46 in conjunction with the write command) based on the on information or the off information included in the CS flag added to the write command W. If the CS flag designates the non-starting of the CSS 46, in S124, the CPU 38 transmits the lba data from the device buffer 42 to the NAND memory 32 (#a7 in FIG. 1).

If the CS flag designates the starting of the CSS 46, the CPU 38 executes the CSS 46 in conjunction with the write command. Specifically, in S114, the firmware 36a starts the CSS 46 (write_prog) in conjunction with the write command (starting (write_prog)) (#a2 in FIG. 1).

The CSS 46 performs a CSS process while performing the following processes as necessary. In S116, the CSS 46 loads the lba data from the device buffer 42 to the CPM 44 (load_db ( )) (#a3 in FIG. 1). In S118, the CSS 46 reads the lba data from the CPM 44, processes the lba data, and writes the processed lba data to the CPM 44 (#a4 in FIG. 1). Examples of the data processing are various processes of computing data and outputting a result of the computation, data error correction coding and decoding processes, data encryption and decryption processes, data compression and decompression, data analysis, and filtering. In S120, the CSS 46 stores the lba data read from the CPM 44 to the device buffer 42 (store db ( )) (#a5 in FIG. 1).

In S122, the CSS 46 returns a completion notice of processing to the firmware 36a (#a6 in FIG. 1).

In S124, the CPU 38 transmits the lba data from the device buffer 42 to the NAND memory 32 (#a7 in FIG. 1).

FIG. 3 is a block diagram for explaining an example of a read operation of the CS of a data processing system according to the first embodiment. A configuration of FIG. 3 is almost the same as that of FIG. 1 and differs therefrom in the command input to the io queue 22.

Figure 4:
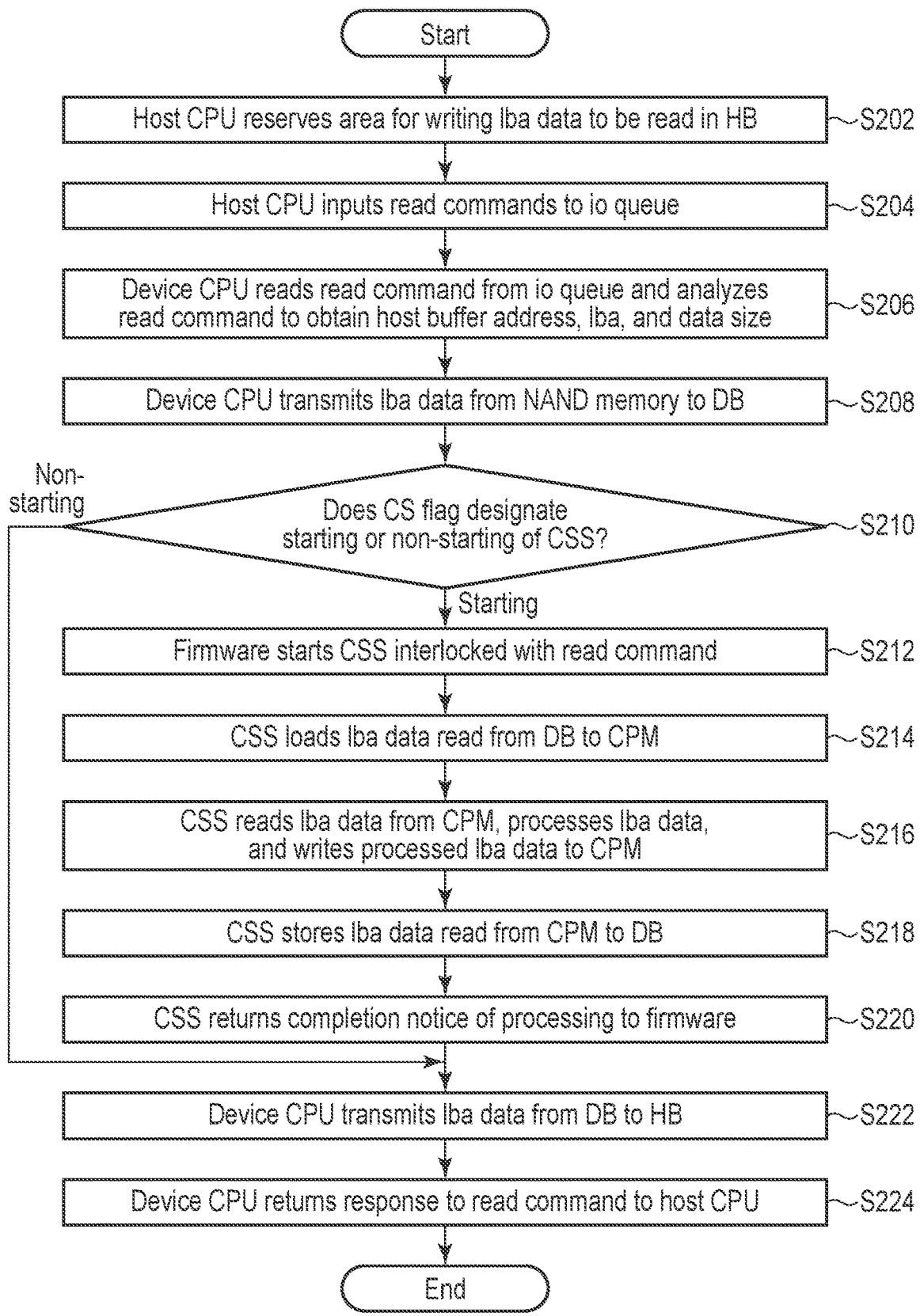
FIG. 4 is a flowchart showing an example of a process of the read operation according to the first embodiment.

FIG. 4 is a flowchart showing an example of a process of the read operation according to the first embodiment.

In S202, the CPU (host CPU) 12 of the host 10 reserves an area for writing lba data to be read, in the host buffer 14.

In S204, the CPU 12 inputs read commands R(off) and/or R(on) to the io queue 22. Each of the read commands R(off) and R(on) includes a host buffer address, an lba, and a data size. The read command R(off) is a read command R to which a CS flag including the off information is added. The read command R(on) is a read command R to which a CS flag including on information designating the starting of the CSS 46 is added.

In S206, the CPU (device CPU) 38 of the CS 30 that executes the firmware 36 reads the read command R from the io queue 22 and analyzes the read command R to obtain the host buffer address, the lba, and the data size.

In S208, based on a result of the analysis, the CPU 38 transmits the lba data from the NAND memory 32 to the device buffer 42 (#b1 in FIG. 3).

In S210, the CPU 38 determines whether the CS flag designates the starting or the non-starting of the CSS 46 (CSS 46 in conjunction with the read command) based on the on information or the off information of the CS flag added to the read command R. If the CS flag designates the non-starting of the CSS 46, in S222, the CPU 38 transmits the lba data from the device buffer 42 to the host buffer 14 (#b7 in FIG. 3).

In S224, the CPU 38 returns a response to the read command R to the CPU 12 of the host 10.

If the CS flag designates the starting of the CSS 46, the CPU 38 executes the CSS 46 in conjunction with the read command. Specifically, in S212, the firmware 36b starts the CSS 46 (read_prog) in conjunction with the read command (starting (read_prog)) (#b2 in FIG. 3).

The CSS 46 performs a CSS process while performing the following processes as necessary. In S214, the CSS 46 loads the lba data read from the device buffer 42 to the CPM 44 (load_db ( )) (#b3 in FIG. 3). In S216, the CSS 46 reads the lba data from the CPM 44, processes the lba data, and writes the processed lba data to the CPM 44 (#b4 in FIG. 3). In S218, the CSS 46 stores the lba data read from the CPM 44 to the device buffer 42 (store db ( )) (#b5 in FIG. 3).

In S220, the CSS 46 returns a completion notice of processing to the firmware 36b (#b6 in FIG. 3).

In S222, the CPU 38 transmits the lba data from the device buffer 42 to the host buffer 14 (#b7 in FIG. 3).

In S224, the CPU 38 returns a response to the read command R to the CPU 12 of the host 10.

According to the first embodiment, the host 10 can select the starting or the non-starting of the CSS 46 in conjunction with the io command of write or read, which cannot be performed by the CS of the transparent operation method, while making use of the software resource of the CS 30.

Second Embodiment

In the first embodiment, the program in conjunction with the write command is one CSS 46 (write_prog), and the program in conjunction with the read command is one CSS 46 (read_prog). Next is a description of a second embodiment in which the CS 30 can selectively execute any of a plurality of programs (CSSs 46) in conjunction with the io commands, and the CS flag includes information for selecting a program in conjunction with a command to be started.

FIG. 5 is a block diagram for explaining an example of a write operation of the CS of a data processing system according to the second embodiment.

A configuration of FIG. 5 is almost the same as that of FIG. 1 except for the following points. In the second embodiment, the CSS 46 is divided into a plurality of slots, and each of the slots corresponds to a program in conjunction with a write command. Each slot, namely, each program in conjunction with the write command is designated by a slot identifier slot_no. The CS flag includes the on information or the off information and a slot identifier slot_no for designating a program in conjunction with the write command to be started.

The firmware 36 includes firmwares 36c and 36d in place of the firmwares 36a and 36b. The firmware 36c is a program for checking the CS flag of the write command W, and for starting the program in conjunction with the io command identified by the slot identifier if the CS flag includes the on information. An example of the firmware 36c is shown below.

```
write ( ) {
  if (CS_flag.CSS == on){
    start (CS_flag.slot_no);
```

```
    wait (CSS_finish);
    }
  }
}
```

The firmware 36*d* is a program for checking the CS flag of the read command R, and for starting a program in conjunction with the io command identified by the slot identifier if the CS flag includes the on information. An example of the firmware 36*d* is shown below.

```
read ( ){
  if (CS_flag.CSS == on){
    start (CS_flag.slot_no);
    wait (CSS_finish);
    }
  }
}
```

In the second embodiment, the host 10 also inputs a CSS load command L to the admin queue 24 before the host 10 inputs the write command W and/or the read command R to the io queue 22. When the CS 30 executes the CSS load command L, the host 10 loads a plurality of programs in conjunction with the write command and a plurality of programs in conjunction with the read command to each of the slots of the CS 30.

Figure 6:
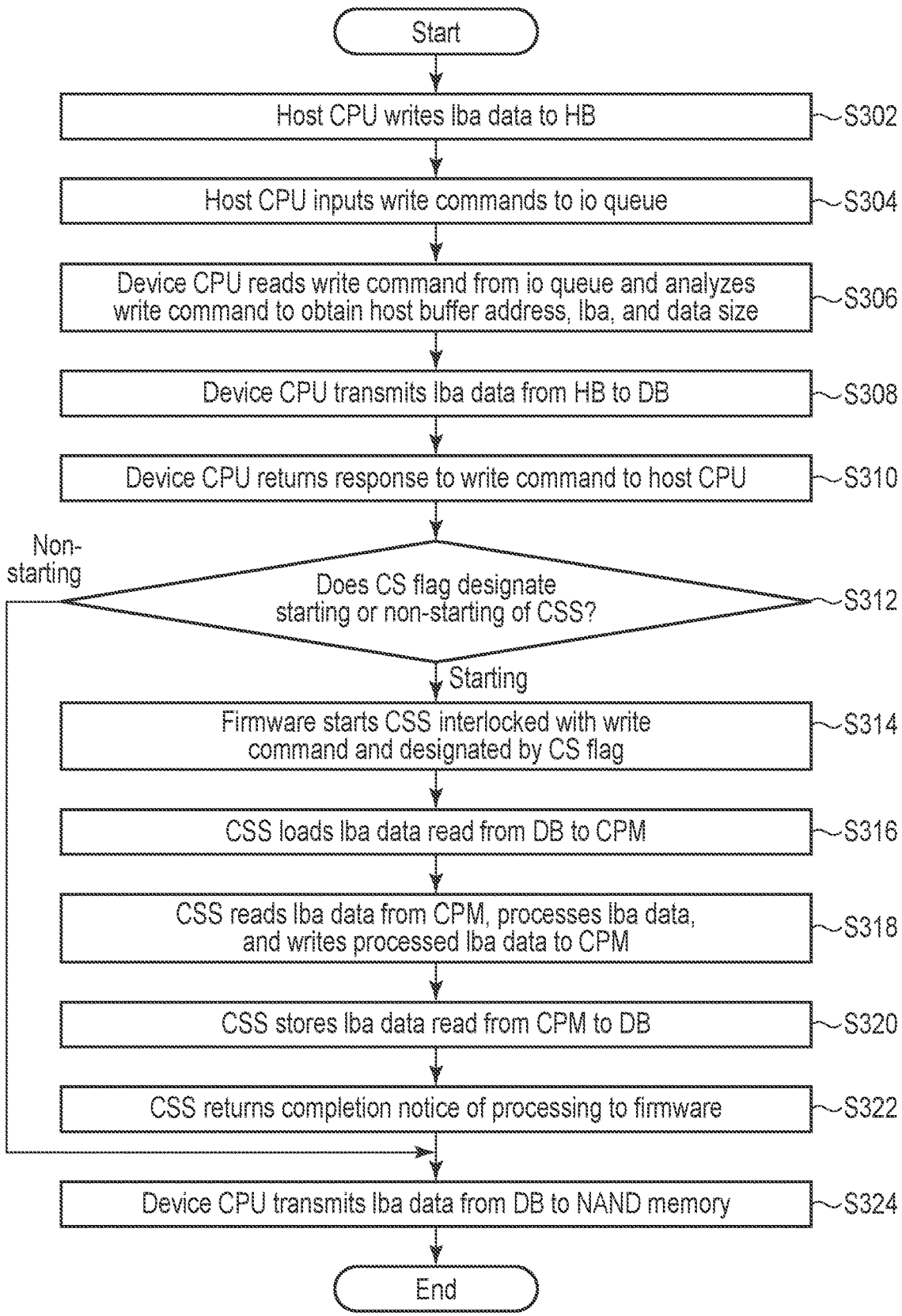
FIG. 6 is a flowchart showing an example of a process of the write operation according to the second embodiment.

FIG. 6 is a flowchart showing an example of a process of the write operation according to the second embodiment.

In S302, the CPU (host CPU) 12 of the host 10 writes the lba data to the host buffer 14.

In S304, the CPU 12 inputs write commands W(off) and/or W(on, slot0) to the io queue 22. Each of the write commands W(off) and W(on, slot0) includes a host buffer address, an lba, and a data size. The write command W(off) is a write command W to which a CS flag including off information is added. The write command W(on, slot0) is a write command W to which a CS flag including on information and a slot identifier slot_no (slot 0) for designating a slot corresponding to the CSS (a program in conjunction with the write command) 46 to be started is added.

In S306, the CPU (device CPU) 38 of the CS 30 that executes the firmware 36 reads the write command W from the io queue 22 and analyzes the write command W to obtain the host buffer address, the lba, and the data size.

In S308, based on a result of the analysis, the CPU 38 transmits the lba data from the host buffer 14 to the device buffer 42 (#c1 in FIG. 5).

In S310, the CPU 38 returns a response to the write command W to the CPU 12 of the host 10.

In S312, the CPU 38 determines whether the CS flag designates the starting or the non-starting of the CSS 46 based on the on information or the off information included in the CS flag added to the write command W. If the CS flag designates the non-starting of the CSS 46, in S324, the CPU 38 transmits the lba data from the device buffer 42 to the NAND memory 32 (#c7 in FIG. 5).

If the CS flag designates the starting of the CSS 46, the CPU 38 executes the CSS 46 in conjunction with the write command corresponding to a slot designated by the slot identifier slot0 included in the CS flag. Specifically, in S314, the firmware 36*c* starts the CSS 46 (starting (slot0)) that is a program in conjunction with the write command and designated by the slot identifier slot0 included in the CS flag (#c2 in FIG. 5).

The CSS 46 performs a CSS process while performing the following processes as necessary. In S316, the CSS 46 loads the lba data read from the device buffer 42 to the CPM 44 (load_db ( )) (#c3 in FIG. 5). In S318, the CSS 46 reads the lba data from the CPM 44, processes the lba data, and writes the processed lba data to the CPM 44 (#c4 in FIG. 5). In S320, the CSS 46 stores the lba data read from the CPM 44 to the device buffer 42 (store db ( )) (#c5 in FIG. 5).

In S322, the CSS 46 returns a completion notice of processing to the firmware 36*a* (#c6 in FIG. 5).

In S324, the CPU 38 transmits the lba data from the device buffer 42 to the NAND memory 32 (#c7 in FIG. 5).

Figure 7:
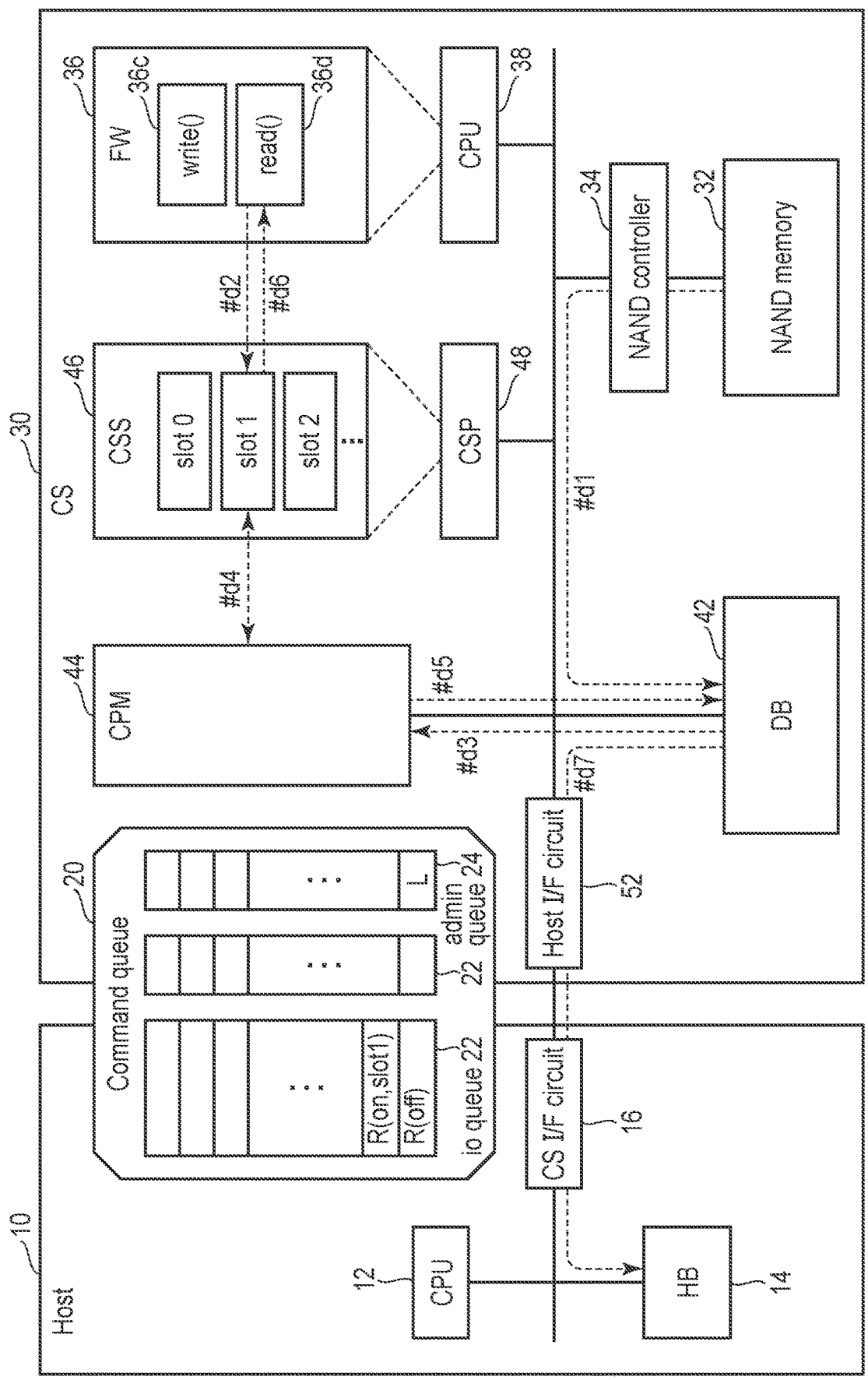
FIG. 7 is a block diagram for explaining an example of a read operation of the CS of the data processing system according to the second embodiment.

FIG. 7 is a block diagram for explaining an example of a read operation of the CS of the data processing system according to the second embodiment. A configuration of FIG. 7 is almost the same as that of FIG. 5, and differs therefrom in the command input to the io queue 22.

Figure 8:
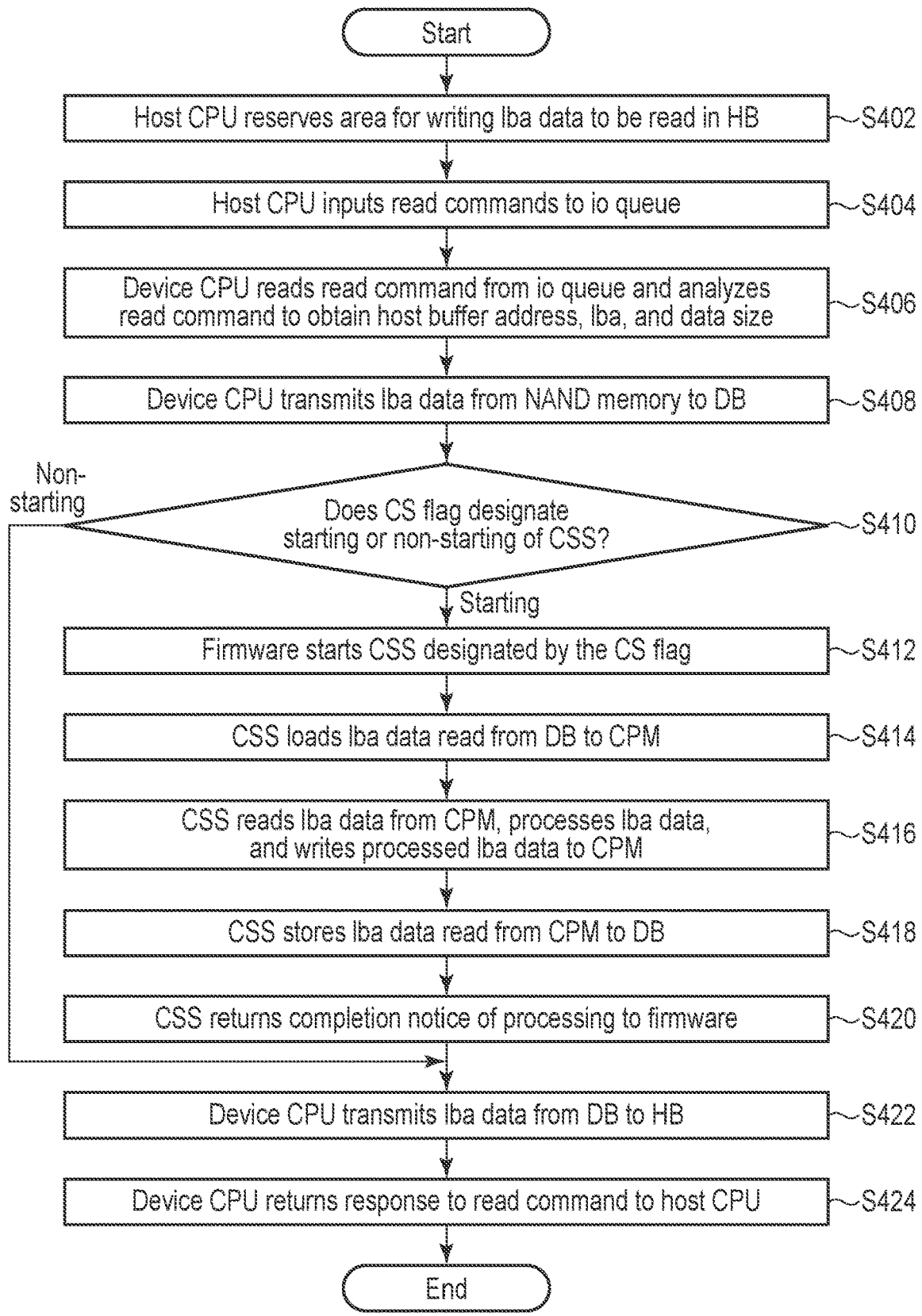
FIG. 8 is a flowchart showing an example of a process of the read operation according to the second embodiment.

FIG. 8 is a flowchart showing an example of a process of the read operation according to the second embodiment.

In S402, the CPU (host CPU) 12 of the host 10 reserves an area for writing lba data to be read, in the host buffer 14.

In S404, the CPU 12 inputs read commands R(off) and/or R(on, slot1) to the io queue 22. Each of the read commands R(off) and R(on, slot1) includes a host buffer address, an lba, and a data size. The read command R(off) is a read command to which a CS flag including off information is added. The read command R(on, slot1) is a read command to which a CS flag including on information and a slot identifier slot_no (slot 1) for designating a slot corresponding to the CSS (a program in conjunction with the read command) 46 to be started is added.

In S406, the CPU (device CPU) 38 of the CS 30 that executes the firmware 36 reads the read command R from the io queue 22 and analyzes the read command R to obtain the host buffer address, the lba, and the data size.

In S408, based on a result of the analysis, the CPU 38 transmits the lba data from the NAND memory 32 to the device buffer 42 (#d1 in FIG. 7).

In S410, the CPU 38 determines whether the CS flag designates the starting or the non-starting of the CSS 46 based on the on information or the off information of the CS flag added to the read command R. If the CS flag designates the non-starting of the CSS 46, in S422, the CPU 38 transmits the lba data from the device buffer 42 to the host buffer 14 (#d7 in FIG. 7).

In S424, the CPU 38 returns a response to the read command R to the CPU 12 of the host 10.

If the CS flag designates the starting of the CSS 46, the CPU 38 executes the CSS 46 in conjunction with the read command corresponding to a slot designated by the slot identifier slot0 included in the CS flag. Specifically, in S412, the firmware 36*d* starts the CSS 46 (starting (slot1)) designated by the CS flag (#d2 in FIG. 7).

The CSS 46 performs a CSS process while performing the following processes as necessary. In S414, the CSS 46 loads the lba data read from the device buffer 42 to the CPM 44 (load_db ( )) (#d3 in FIG. 7). In S416, the CSS 46 reads the lba data from the CPM 44, processes the lba data, and writes the processed lba data to the CPM 44 (#d4 in FIG. 7). In S418, the CSS 46 stores the lba data read from the CPM 44 to the device buffer 42 (store db ( )) (#d5 in FIG. 7).

In S420, the CSS 46 returns a completion notice of processing to the firmware 36*d* (#d6 in FIG. 7).

In S422, the CPU 38 transmits the lba data from the device buffer 42 to the host buffer 14 (#d7 in FIG. 7).

In S424, the CPU 38 returns a response to the read command R to the CPU 12 of the host 10.

According to the second embodiment, in addition to the advantage of the first embodiment, the CSS 46 to be started for each write or read io command, can be selected.

The second embodiment may be modified wherein information designating the starting or the non-starting of the CSS 46 is deleted from the CS flag, the CSS 46 is always started, and the program of the CSS 46 to be started is designated by the slot identifier.

That is, in the modification, the write command W(off) is not defined, and the write command W(on, slot_no) is changed to a write command W(slot_no). Similarly, the read command R(off) is not defined, and the read command R(on, slot_no) is changed to a read command R(slot_no).

Third Embodiment

In the first and second embodiments, the contents of data processing by the CSS 46 are fixed. In the third embodiment, the host 10 transmits a CS parameter to the CSS 46. The CS parameter can be referred to in data processing. The contents of the data processing can be varied by the CS parameter. An example of the CS parameter is a type of data processing (encryption method and encryption key).

The host 10 may put the CS parameter in a CS flag and transmit the CS flag with the CS parameter to the CSS 46. In this case, the size of the CS flag depends on the CS parameter. If the size of the CS parameter is large, the size of the CS flag is also large.

The host 10 may also put information, which can specify the CS parameter, in the CS flag and transmit the CS flag with the information to the CSS 46. For example, the CS parameter may be written to the CPM 44. The address and the size of the CPM 44 storing the CS parameter may be included in the CS flag and transmitted to the CSS 46. In this case, the size of the CS flag may be constant. Even if the size of the CS parameter increases, the size of the CS flag does not increase accordingly. The third embodiment is so modified that the CS flag of the first or second embodiment further includes information which can specify the CS parameter.

Figure 9:
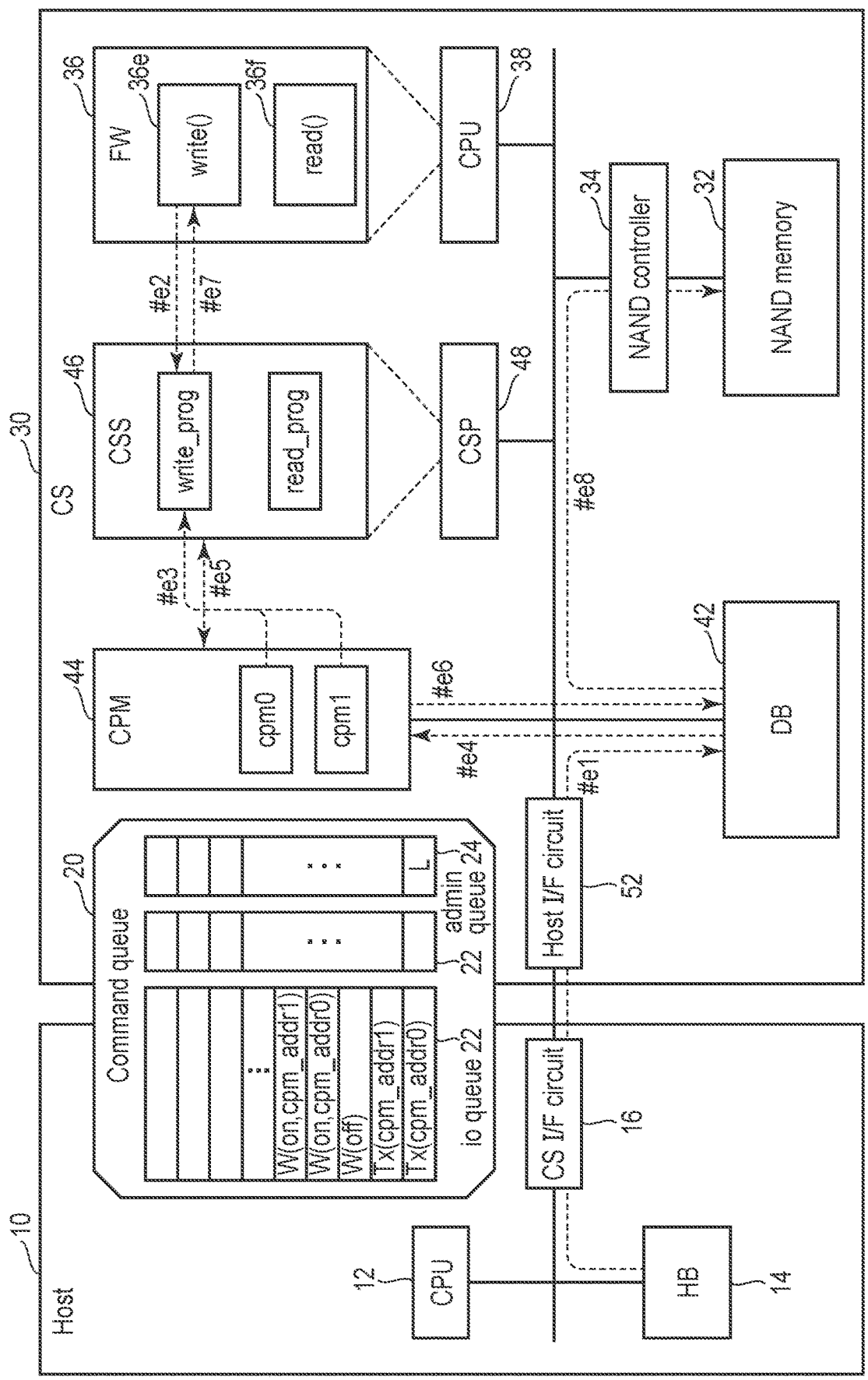
FIG. 9 is a block diagram for explaining an example of a write operation of a CS of a data processing system according to a third embodiment.

FIG. 9 is a block diagram for explaining an example of a write operation of the CS of a data processing system according to the third embodiment. The third embodiment can be implemented as a modification of the first embodiment or the second embodiment. Below is a description of the third embodiment implemented as a modification of the first embodiment.

A configuration of FIG. 9 is almost the same as that of FIG. 1 except for the following points. In the third embodiment, the CS flag of the write command W or the read command R includes the on information or the off information, and information indicating a storage area of the CS parameter.

A transmission command Tx is defined to instruct the host buffer 14 to transmit data to the CPM 44.

The firmware 36 includes firmware 36e and 36f in place of the firmwares 36a and 36b. The firmware 36e is a program for checking the CS flag of the write command W, and for referring to the CS parameter if the CS flag includes the on information. An example of the firmware 36e is shown below. In the example, a storage area for CS parameter is designated as "cpm_addr".

```
write ( ) {
  if (CS_flag.CSS == on) {
```

```
    start (write_prog, CS_flag.cpm_addr);
    wait (CSS_finish);
  }
}
```

The firmware 36f is a program for checking the CS flag of the read command R, and for referring to the CS parameter if the CS flag includes the on information. An example of the firmware 36f is shown below.

```
read ( ) {
  if (CS_flag.CSS == on) {
    start (read_prog, CS_flag.cpm_addr);
    wait (CSS_finish);
  }
}
```

In the third embodiment, the host 10 also inputs a CSS load command L to the admin queue 24 before the host 10 inputs the write command W and the read command R. When the CS 30 executes the CSS load command L, the host 10 loads a program write_prog in conjunction with the write command and a program read_prog in conjunction with the read command to the CS 30.

Figure 10:
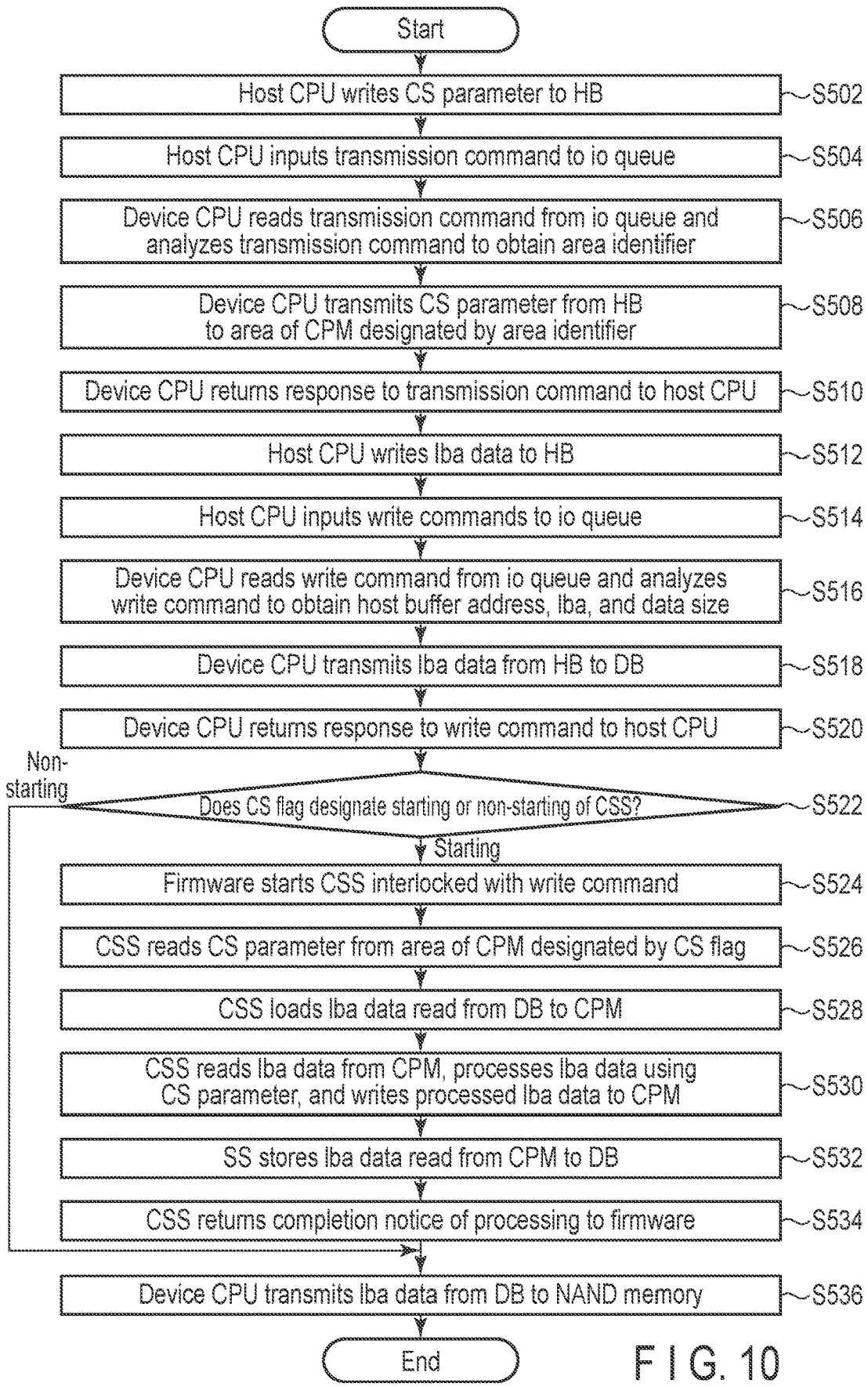
FIG. 10 is a flowchart showing an example of a process of the write operation according to the third embodiment.

FIG. 10 is a flowchart showing an example of a process of the write operation according to the third embodiment.

In S502, the CPU (host CPU) 12 of the host 10 writes the CS parameter to the host buffer 14.

In S504, the CPU 12 inputs a transmission command Tx(cpm_addr0) or Tx(cpm_addr1) to the io queue 22. The transmission command Tx(cpm_addr) requests the host buffer 14 to transmit the CS parameter to an area of the CPM 44. The transmission command Tx(cpm_addr) includes an area identifier cpm_addr designating the area of the CPM 44 to which the CS parameter is transmitted.

In S506, the CPU (device CPU) 38 of the CS 30 that executes the firmware 36 reads the transmission command Tx(cpm_addr) from the io queue 22 and analyzes the transmission command Tx(cpm_addr) to obtain the area identifier cpm_addr.

In S508, the CPU 38 transmits the CS parameter from the host buffer 14 to the area of the CPM 44 designated by the area identifier cpm_addr.

In S510, the CPU 38 returns a response to the transmission command Tx(cpm_addr) to the CPU 12 of the host 10.

In S512, the CPU 12 of the host 10 writes the lba data to the host buffer 14.

In S514, the CPU 12 inputs write commands W(off), W(on, cpm_addr0), and/or W(on, cpm_addr1) to the io queue 22. Each of the write commands W(off), W(on, cpm_addr0), and W(on, cpm_addr1) includes a host buffer address, an lba, and a data size. The write command W(off) is a write command W to which a CS flag including off information is added. The write command W(on, cpm_addr) is a write command W to which a CS flag including on information and an area identifier com_addr of the CPM 44 designating a storage area of the CS parameter which is referred to by the CSS program to be started is added.

In S516, the CPU 38 reads the write command W from the io queue 22 and analyzes the write command W to obtain the host buffer address, the lba, and the data size.

In S518, based on a result of the analysis, the CPU 38 transmits the lba data from the host buffer 14 to the device buffer 42 (#e1 in FIG. 9).

In S520, the CPU 38 returns a response to the write command W to the CPU 12 of the host 10.

In S522, the CPU 38 determines whether the CS flag designates the starting or the non-starting of the CSS 46 based on the on information or the off information included in the CS flag added to the write command W. If the CS flag designates the non-starting of the CSS 46, in S536, the CPU 38 transmits the lba data from the device buffer 42 to the NAND memory 32 (#e8 in FIG. 9).

If the CS flag designates the starting of the CSS 46, the CPU 38 executes the CSS 46 in conjunction with the write command. Specifically, in S524, the firmware 36e starts the CSS 46 (starting (write_prog)) in conjunction with the write command (#e2 in FIG. 9).

In S526, the CSS 46 reads the CS parameter from the area cpm of the CPM 44 designated by the area identifier included in the CS flag (#e3 in FIG. 9).

The CSS 46 performs a CSS process while performing the following processes as necessary. In S528, the CSS 46 loads the lba data read from the device buffer 42 to the CPM 44 (load_db ( )) (#e4 in FIG. 9). In S530, the CSS 46 reads the lba data from the CPM 44, processes the lba data using the CS parameter, and writes the processed lba data to the CPM 44 (#e5 in FIG. 9). In S532, the CSS 46 stores the lba data read from the CPM 44 to the device buffer 42 (store db ( )) (#e6 in FIG. 9).

In S534, the CSS 46 returns a completion notice of processing to the firmware 36e (#e7 in FIG. 9).

In S536, the CPU 38 transmits the lba data from the device buffer 42 to the NAND memory 32 (#e8 in FIG. 9).

Figure 11:
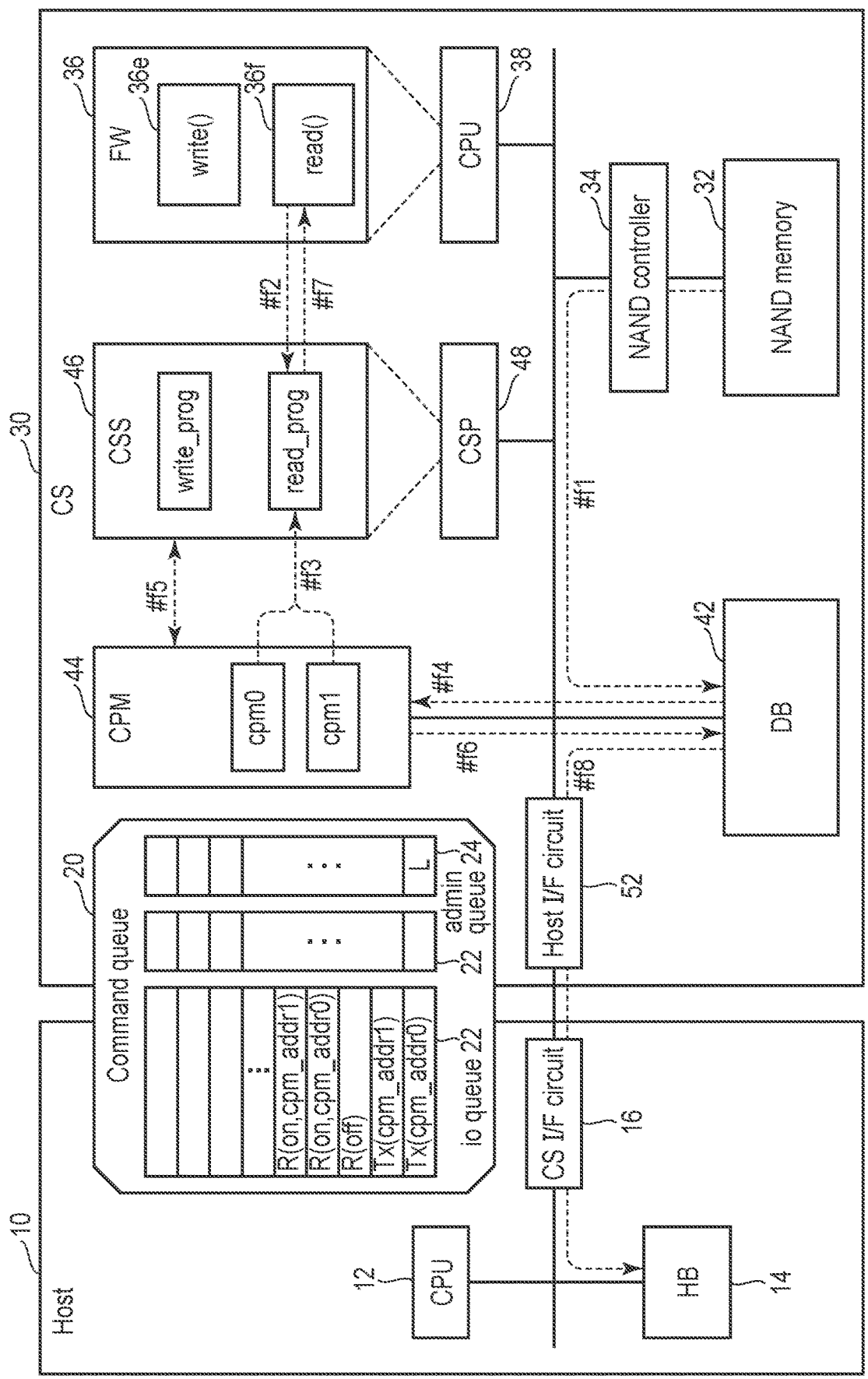
FIG. 11 is a block diagram for explaining an example of a read operation of the CS of the data processing system according to the third embodiment.

FIG. 11 is a block diagram for explaining an example of a read operation of the CS of the data processing system according to the third embodiment.

A configuration of FIG. 11 is almost the same as that of FIG. 9 and differs therefrom in the command input to the io queue 22.

Figure 12:
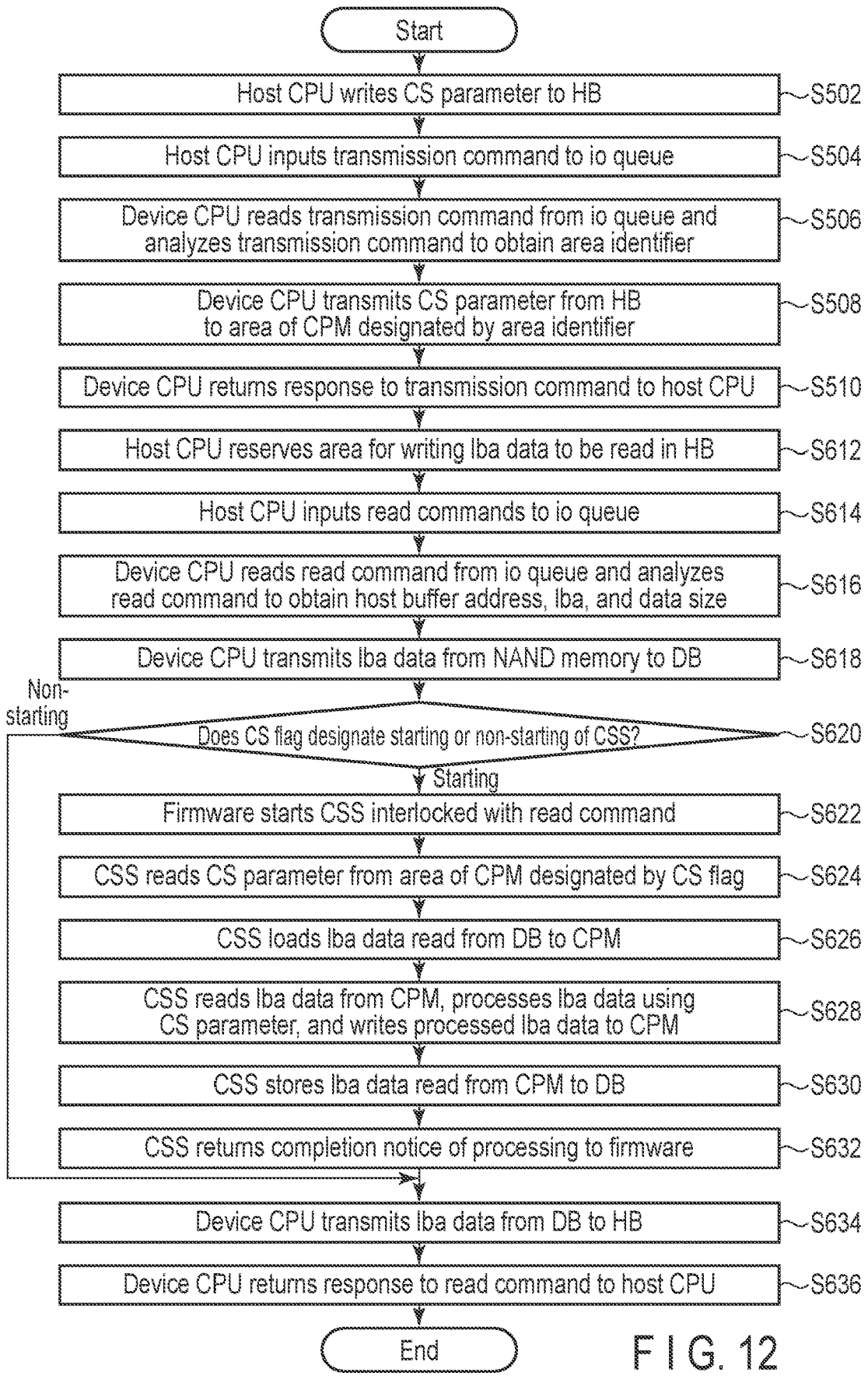
FIG. 12 is a flowchart showing an example of a process of the read operation according to the third embodiment.

FIG. 12 is a flowchart showing an example of a process of the read operation according to the third embodiment.

The process in steps S502 to S510 of loading the CS parameter to the CPM 44 by the transmission command Tx is the same as that in FIG. 10.

In S612, the CPU (host CPU) 12 of the host 10 reserves an area for writing lba data to be read, in the host buffer 14.

In S614, the CPU 12 inputs read commands R(off), R(on, cpm_addr0), and/or R(on, cpm_addr1) to the io queue 22. Each of the read commands R(off), R(on, cpm_addr0), and R(on, cpm_addr1) includes a host buffer address, an lba, and a data size. The read command R(off) is a read command R to which a CS flag including off information is added. The read command R(on, cpm_addr) is a read command R to which a CS flag including on information and an area identifier com_addr designating a storage area of the CS parameter which is referred to by a CSS program to be started, is added.

In S616, the CPU (device CPU) 38 of the CS 30 reads the read command R from the io queue 22 and analyzes the read command R to obtain the host buffer address, the lba, and the data size.

In S618, based on a result of the analysis, the CPU 38 transmits the lba data from the NAND memory 32 to the device buffer 42 (#f1 in FIG. 11).

In S620, the CPU 38 determines whether the CS flag designates the starting or the non-starting of the CSS 46 based on the on information or the off information of the CS flag added to the read command R. If the CS flag designates the non-starting of the CSS 46, in S634, the CPU 38 transmits the lba data from the device buffer 42 to the host buffer 14 (#f8 in FIG. 11).

In S636, the CPU 38 returns a response to the read command R to the CPU 12 of the host 10.

If the CS flag designates the starting of the CSS 46, the CPU 38 starts the CSS 46 in conjunction with the read command. Specifically, in S622, the firmware 36f starts the CSS 46 in conjunction with the read command (starting (read_prog)) (#f2 in FIG. 11).

In S624, the CSS 46 reads the CS parameter from the area cpm of the CPM 44 designated by the area identifier included in the CS flag (#f3 in FIG. 11).

The CSS 46 performs a CSS process while performing the following processes as necessary. In S626, the CSS 46 loads the lba data read from the device buffer 42 to the CPM 44 (load_db ( )) (#f4 in FIG. 11). In S628, the CSS 46 reads the lba data from the CPM 44, processes the lba data using the CS parameter, and writes the processed lba data to the CPM 44 (#f5 in FIG. 11). In S630, the CSS 46 stores the lba data read from the CPM 44 to the device buffer 42 (store db ( )) (#f6 in FIG. 11).

In S632, the CSS 46 returns a completion notice of processing to the firmware 36e (#f7 in FIG. 11).

In S634, the CPU 38 transmits the lba data from the device buffer 42 to the host buffer 14 (#f8 in FIG. 11).

In S636, the CPU 38 returns a response to the read command R to the CPU 12.

According to the third embodiment, in addition to the advantage of the first embodiment, the CS parameter, which is referred to by the CSS 46 in conjunction with the write/read io command, can be selected.

The third embodiment may be modified wherein the on information or the off information is deleted from the CS flag, the CSS 46 is always started, and the parameter, which is referred to by the CSS 46 to be started, can be designated by the area identifier of the CPM 44.

That is, in the modification, the write command W(off) is not defined, and the write command W(on, slot_no) is changed to a write command W(slot_no). Similarly, the read command R(off) is not defined, and the read command R(on, slot_no) is changed to a read command R(slot_no).

Fourth Embodiment

The third embodiment described with reference to FIGS. 9 to 12 is implemented as a modification of the first embodiment (a CS parameter selection function is added to the CS flag of the first embodiment). In the fourth embodiment, the CS parameter selection function is added to the CS flag of the second embodiment.

Configurations of the host 10, the command queue 20, and the CS 30 in the fourth embodiment are the same as those in the first, second and third embodiments. The fourth embodiment differs from the first, second, and third embodiments in commands stored in the command queue 20 and processing of the firmware 36. A CS flag of the write command W or the read command R includes the on information or the off information, the slot identifier slot_no designating a slot corresponding to the CSS 46 to be started, and an area identifier designating a storage area of the CS parameter.

FIGS. 13A and 13B respectively show examples of a command input to the io queue 22 by the host 10 in the fourth embodiment.

FIG. 13A shows an example of the io queue 22 when the host 10 issues a write command. The host 10 inputs a transmission command Tx(cpm_addr0) or Tx(cpm_addr1)

to the io queue 22. Then, the host 10 inputs a write command W(on, slot0, cpm_addr0) or W(on, slot1, cpm_addr1) with the CS flag to the io queue 22. The write command W(on, slot_no, cpm_addr) designates the starting of the CSS 46 corresponding to a slot. The started CSS 46 designates data processing using the CS parameter stored in an area cpm of the CPM 44.

In order to respond to the write command, the firmware 36 includes the following firmware.

```
write ( ) {
    if (CS_flag.CSS == on) {
        start (CS_flag.slot_no, CS_flag.cpm_addr);
        wait (CSS_finish);
    }
}
```

FIG. 13B shows an example of the io queue 22 when the host 10 issues a read command. The host 10 inputs a transmission command Tx(cpm_addr0) or Tx(cpm_addr1) to the io queue 22. Then, the host 10 inputs a read command R(on, slot0, cpm_addr0) or R(on, slot1, cpm_addr1) with a CS flag to the io queue 22. The read command R(on, slot_no, cpm_addr) designates the starting of the CSS 46 corresponding to a slot, and the started CSS 46 designates data processing using the CS parameter stored in an area cpm of the CPM 44.

In order to respond to the read command, the firmware 36 includes the following firmware.

```
read ( ) {
    if (CS_flag.CSS == on) {
        start (CS_flag.slot_no, CS_flag.cpm_addr);
        wait (CSS_finish);
    }
}
```

In the fourth embodiment, the CS flag of the write command W or read command R includes the on information or the off information, the slot identifier slot_no designating a slot corresponding to the CSS 46 to be started, and an area identifier cpm_addr designating a storage area of the CS parameter.

According to the fourth embodiment, in addition to the advantage of the second embodiment, the CS parameter, which is referred to by the CSS 46 in conjunction with the write/read io command, can be selected.

The fourth embodiment may be modified wherein the on information or the off information is deleted from the CS flag, the CSS 46 is always started, and the CS parameter, which is referred to by the CSS 46 to be started, can be designated.

That is, in the modification, the write command W(on, slot_no, cpm_addr) is changed to a write command W(slot_no, cpm_addr). Similarly, the read command R(on, slot_no, cpm_addr) is changed to a read command R(slot_no, cpm_addr).

Fifth Embodiment

The processing of the CSS 46, especially the processing of the read operation, may require CS attribute information. Examples of the CS attribute information are information designating which data is encoded by which error correction code, information designating which data is encrypted by which encryption key, and information designating which data is compressed and how it is done. The CSS 46 may change in an error correction code, an encryption key, and a compression method depending on conditions at the time of writing. The conditions may include the contents of data. For example, the CSS 46 may encrypt a file including a specific character string by an encryption key A and encrypt a file not including the specific character string by an encryption key B. Since, in this case, the specific character string is also encrypted in the encrypted file, the CSS 46 cannot determine from the encrypted file whether or not the specific character string is included in the file at the time of reading. If, in this case, there is CS attribute information designating which data is encrypted by which encryption key, the CSS 46 can correctly decrypt the read data.

In the fifth embodiment, the CSS 46 writes the CS attribute information to the NAND memory 32 together with the lba data, then reads the CS attribute information from the NAND memory 32, and uses the attribute information for subsequent processing. The fifth embodiment can be applied to one of the four embodiments described above. Below is a description of the fifth embodiment applied to the first embodiment.

FIG. 14 is a block diagram for explaining an example of a write operation of the CS of a data processing system according to the fifth embodiment. In the fifth embodiment, a function of writing a CS attribute information generated by the CSS 46 to the NAND memory 32 or the device buffer 42 together with the lba data is added to the first embodiment shown in FIGS. 1 to 4.

FIG. 14 shows an example in which attribute information cs_attr is stored close to lba data lba_data. The storage location of the CS attribute information cs_attr need not be physically close to the lba data lba_data, and may be anywhere if the CS attribute information cs_attr can be linked to the lba data lba_data. For example, the CS attribute information cs_attr may be managed and stored in a lookup table together with address information.

Figure 15:
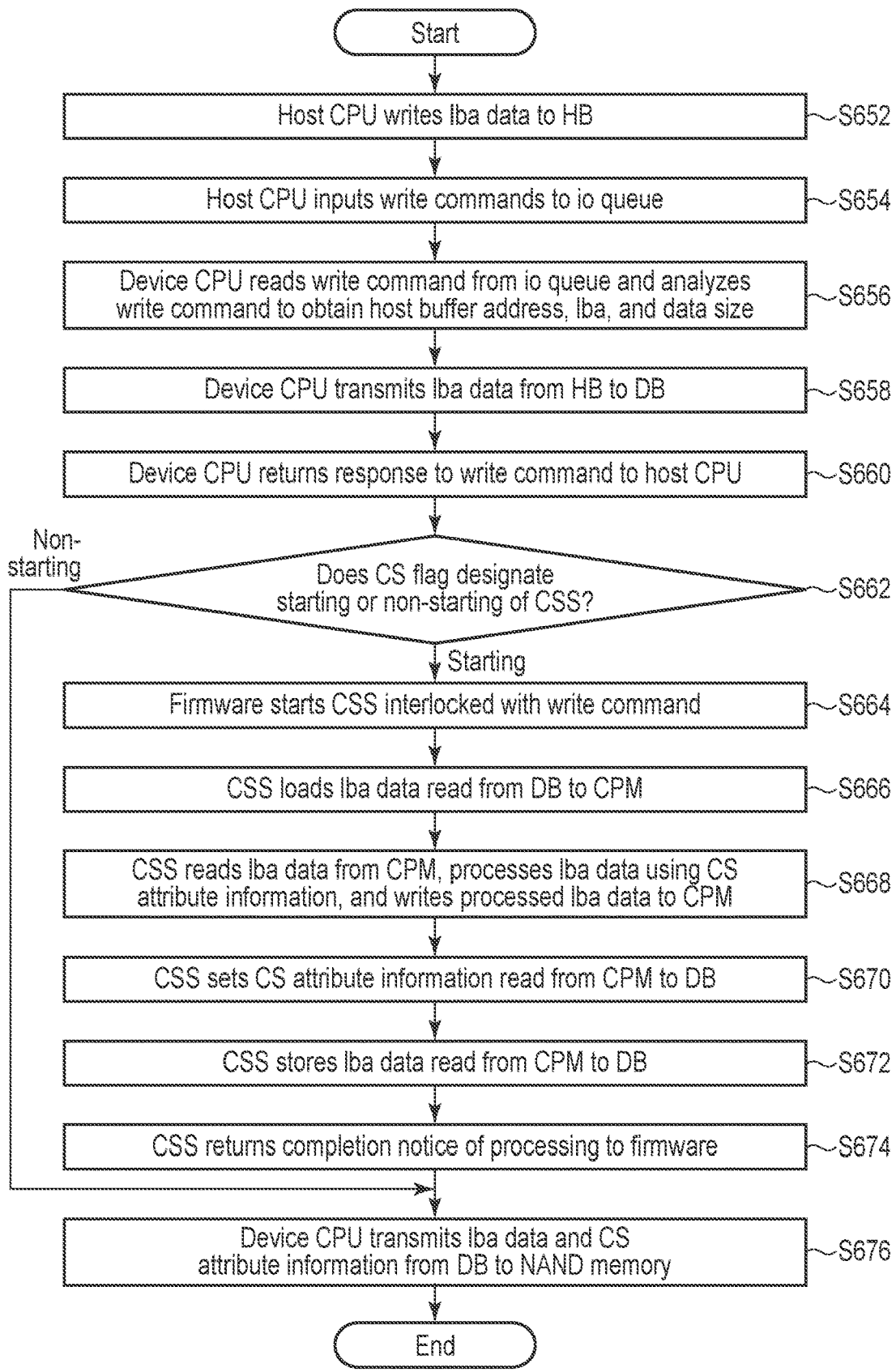
FIG. 15 is a flowchart showing an example of a process of the write operation according to the fifth embodiment.

FIG. 15 is a flowchart showing an example of a process of a write operation according to the fifth embodiment.

In S652, the CPU (host CPU) 12 of the host 10 writes the lba data to the host buffer 14.

In S654, the CPU 12 inputs write commands W(off) and/or W(on) to the io queue 22.

In S656, the CPU (device CPU) 38 of the CS 30 reads the write command W from the io queue 22 and analyzes the write command W to obtain a host buffer address, an lba, and a data size.

In S658, based on a result of the analysis, the CPU 38 transmits the lba data from the host buffer 14 to the device buffer 42 (#g1 in FIG. 14).

In S660, the CPU 38 returns a response to the write command W to the CPU 12 of the host 10.

In S662, the CPU 38 determines whether the CS flag designates the starting or the non-starting of the CSS 46 on the basis of the on information or the off information included in a CS flag added to the write command W. If the CS flag designates the non-starting of the CSS 46, in S676, the CPU 38 transmits the lba data and the CS attribute information from the device buffer 42 to the NAND memory 32 (#g8 in FIG. 14).

If the CS flag designates the starting of the CSS 46, the CPU 38 executes the CSS 46 in conjunction with the write command. Specifically, in S664, the firmware 36a starts the CSS 46 in conjunction with the write command (starting (write_prog)) (#g2 in FIG. 14).

The CSS 46 performs a CSS process while performing the following processes as necessary. In S666, the CSS 46 loads the lba data read from the device buffer 42 to the CPM 44 (load_db ( )) (#g3 in FIG. 14). In S668, the CSS 46 reads the lba data from the CPM 44, processes the lba data using the CS attribute information cs_attr, and writes the processed lba data to the CPM 44 (#g4 in FIG. 14). Note that the generation time of the CS attribute information cs_attr is not limited, but the CS attribute information has only to be generated until then. In S670, the CSS 46 sets the CS attribute information cs_attr read from the CPM 44 to the device buffer 42 (set cs ( )) (#g5 in FIG. 14).

In S672, the CSS 46 stores the lba data read from the CPM 44 to the device buffer 42 (store db ( )) (#g6 in FIG. 14).

In S674, the CSS 46 returns a completion notice of processing to the firmware 36*e* (#g7 in FIG. 14).

In S676, the CPU 38 transmits the lba data and the CS attribute information from the device buffer 42 to the NAND memory 32 (#g8 in FIG. 14). Note that the CS attribute information need not be transmitted to the NAND memory 32 if power is always supplied to the CS 30 and the device buffer 42 stores the CS attribute information nonvolatilely.

Figure 16:
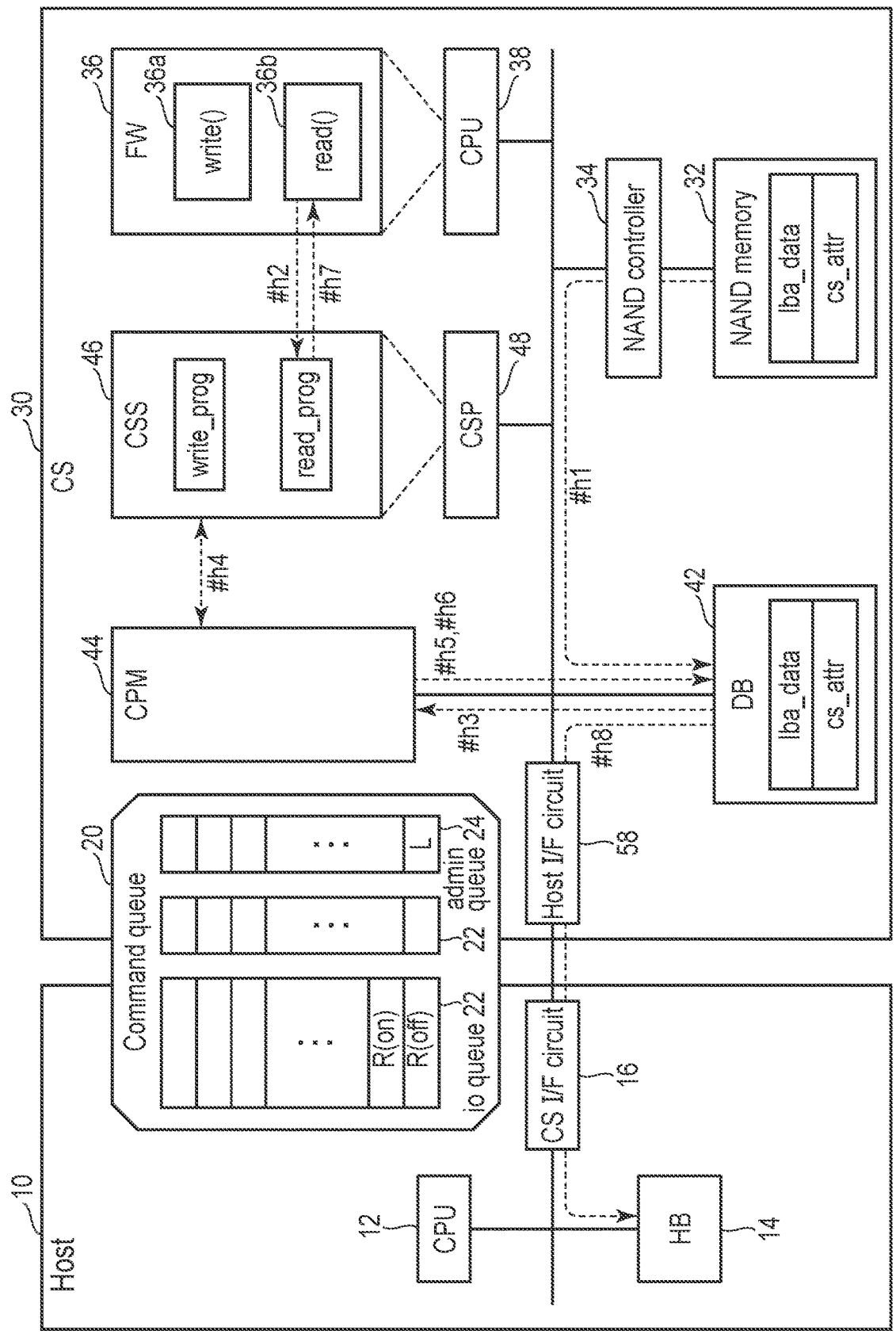
FIG. 16 is a block diagram for explaining an example of a read operation of the CS of the data processing system according to the fifth embodiment.

FIG. 16 is a block diagram for explaining an example of a read operation of the CS of the data processing system according to the fifth embodiment. A configuration of FIG. 16 is almost the same as that of FIG. 14, and differs therefrom in a command input to the io queue 22.

Figure 17:
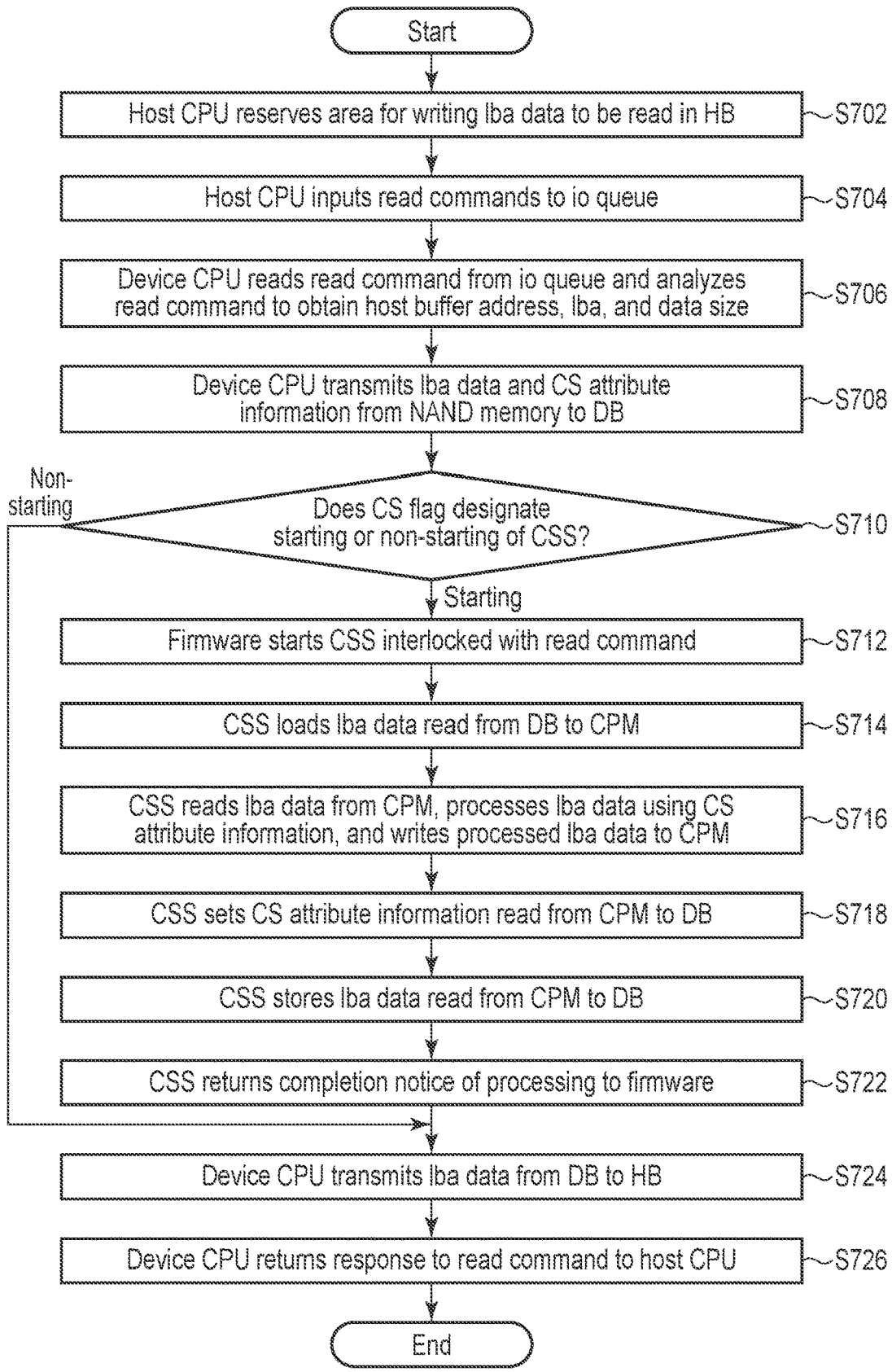
FIG. 17 is a flowchart showing an example of a process of the read operation according to the fifth embodiment.

FIG. 17 is a flowchart showing an example of a process of the read operation according to the fifth embodiment.

In S702, the CPU (host CPU) 12 of the host 10 reserves an area for writing lba data to be read in the host buffer 14.

In S704, the CPU 12 inputs read commands R(off) and/or R(on) to the io queue 22.

In S706, the CPU (device CPU) 38 of the CS 30 reads a read command R from the io queue 22 and analyzes the read command R to obtain a host buffer address, an lba, and a data size.

In S708, based on a result of the analysis, the CPU 38 transmits the lba data and the CS attribute information from the NAND memory 32 to the device buffer 42 (#h1 in FIG. 16). Note that power is always supplied to the CS 30 and thus the CS attribute information need not be transmitted to the NAND memory 32 if the device buffer 42 stores the CS attribute information nonvolatilely.

In S710, the CPU 38 determines whether the CS flag designates the starting or the non-starting of the CSS 46 based on the on information or the off information included in the CS flag added to the read command R. If the CS flag designates the non-starting of the CSS 46, in S724, the CPU 38 transmits the lba data from the device buffer 42 to the host buffer 14 (#h8 in FIG. 16).

In S726, the CPU 38 returns a response to the read command R to the CPU 12 of the host 10.

If the CS flag designates the starting of the CSS 46, the CPU 38 executes a program in conjunction with the read command. Specifically, in S712, the firmware 36*b* starts the CSS 46 in conjunction with the read command (starting (read_prog)) (#h2 in FIG. 16).

The CSS 46 performs a CSS process while performing the following processes as necessary.

In S714, the CSS 46 loads the lba data read from the device buffer 42 to the CPM 44 (load db ( )) (#h3 in FIG. 16). In S716, the CSS 46 reads the lba data from the CPM 44, processes the lba data using the CS attribute information, and writes the processed lba data to the CPM 44 (#h4 in FIG. 16).

In S718, the CSS 46 sets the CS attribute information read from the CPM 44 to the device buffer 42 (set cs_attr ( )) (#h5 in FIG. 16). Note that the generation time of the CS attribute information cs_attr is not limited, but the CS attribute information cs_attr has only to be generated until then.

In S720, the CSS 46 stores the lba data read from the CPM 44 to the device buffer 42 (store db ( )) (#h6 in FIG. 16).

In S722, the CSS 46 returns a completion notice of processing to the firmware 36*b* (#h7 in FIG. 16).

In S724, the CPU 38 transmits the lba data from the device buffer 42 to the host buffer 14 (#h8 in FIG. 16).

In S726, the CPU 38 returns a response to the read command R to the CPU 12 of the host 10.

According to the fifth embodiment, in addition to the advantage of the first embodiment, the CS attribute information generated by the CSS 46 is written to the NAND memory 32 or the device buffer 42 together with data when the write command is executed. The CS attribute information is read from the NAND memory 32 or the device buffer 42 when the read command is executed. The process related to the read command can be performed based on the CS attribute information. The CSS 46 can thus branch the process according to the condition when the read command is executed.

Storing the CS attribute information into the NAND memory 32 or the device buffer 42 can also be applied to the second, third or fourth embodiment.

According to a first modification of the fifth embodiment, storage of the CS attribute information into the NAND memory 32 or the device buffer 42 is applied to the second embodiment. In the first modification, a function of writing the CS attribute information generated by the CSS 46 to the NAND memory 32 or the device buffer 42 together with the lba data when the write command is executed is added to the second embodiment shown in FIGS. 5 to 8. A function of reading the CS attribute information from the NAND memory 32 or the device buffer 42 when the read command is executed is also added to the second embodiment shown in FIGS. 5 to 8.

According to a second modification of the fifth embodiment, storage of the CS attribute information into the NAND memory 32 or the device buffer 42 is applied to the third embodiment. In the second modification, a function of writing the CS attribute information generated by the CSS 46 to the NAND memory 32 or the device buffer 42 together with the lba data when the write command is executed is added to the third embodiment shown in FIGS. 9 to 12. A function of reading the CS attribute information from the NAND memory 32 or the device buffer 42 when the read command is executed is also added to the third embodiment shown in FIGS. 9 to 12.

According to a third modification of the fifth embodiment, storage of the CS attribute information into the NAND memory 32 or the device buffer 42 is applied to the fourth embodiment. In the third modification, a function of writing the CS attribute information generated by the CSS 46 to the NAND memory 32 or the device buffer 42 together with the lba data when the write command is executed is added to an embodiment including both the second and third embodiments shown in FIGS. 5 to 12. A function of reading the CS attribute information from the NAND memory 32 or the device buffer 42 when the read command is executed is also added to the embodiment including both the second and third embodiments shown in FIGS. 5 to 12.

Next is a description of some examples of a program flow of the host 10 and a program flow of the CS 30.

Sixth Embodiment

The program flow of the CPU 12 of the host 10 and the program flow of the CS 30 in the fourth embodiment will be described as a sixth embodiment.

Figure 18:
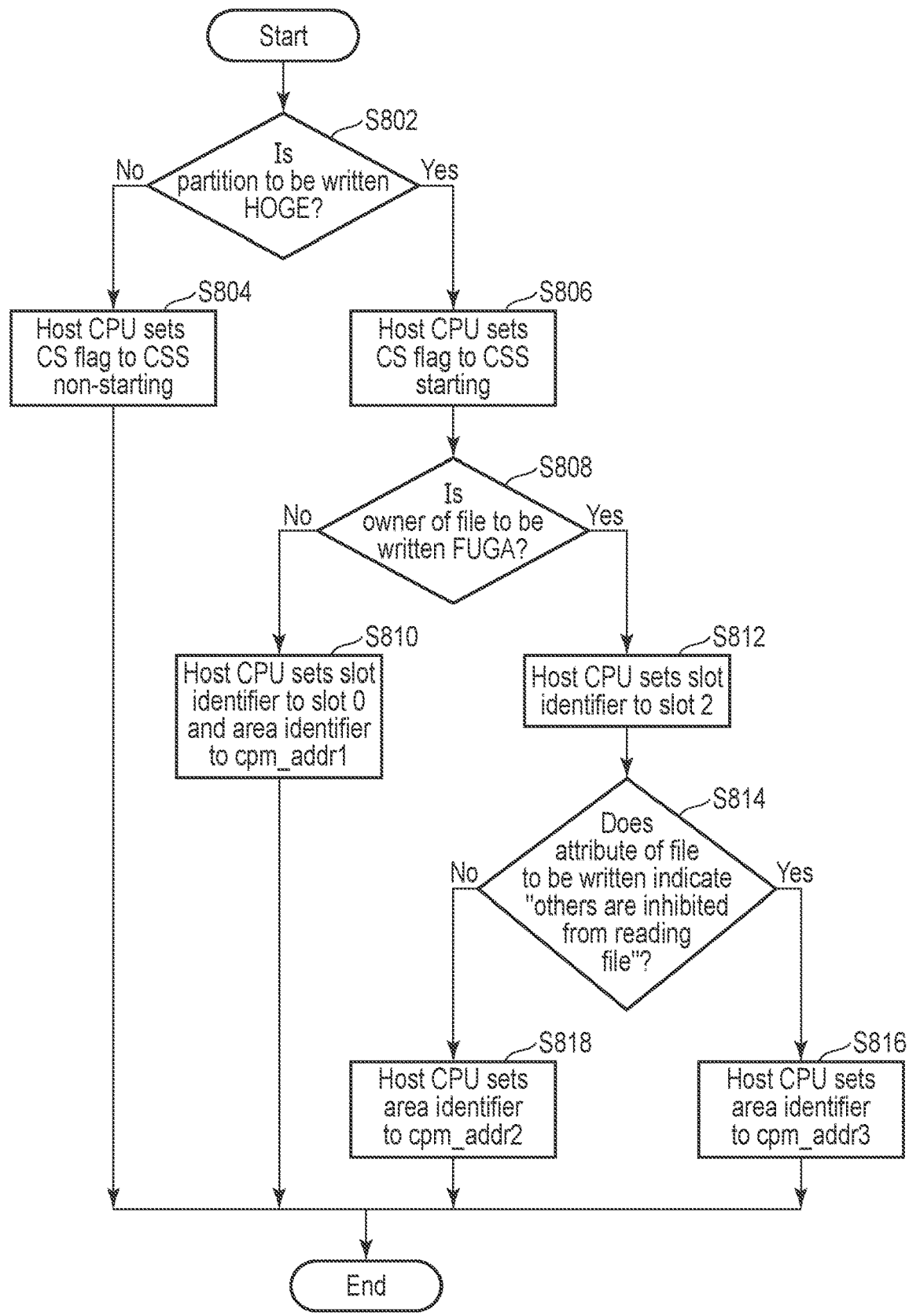
FIG. 18 is a flowchart for explaining an example of a CS flag generation process in a write operation according to a sixth embodiment.

FIG. 18 is a flowchart showing an example of a CS flag generation process when a write command is issued by the CPU 12 of the host 10. When the CS flag generation process is started, the CPU 12 determines in S802 whether a partition to be written is a specific partition (a partition HOGE in this example). If the partition to be written is not the partition HOGE (NO in S802), the CPU 12 sets on information or off information of the CS flag to CSS non-starting (off) in S804, and terminates the process.

If the partition to be written is the partition HOGE (YES in S802), the CPU 12 sets the on information or the off information of the CS flag to CSS starting (on) in S806.

In S808, the CPU 12 determines whether the owner of the file to be written is a specific owner (owner FUGA). If the owner of the file to be written is not the owner FUGA (NO in S808), the CPU 12 sets a slot identifier of the CS flag to a certain slot (slot 0 in this example) in S810, sets an area identifier of the CPM 44 of the CS flag to a certain area (cpm_addr1 in this example), and then terminates the process.

If the owner of the file to be written is the owner FUGA (YES in S808), the CPU 12 sets the slot identifier of the CS flag to a certain slot (slot 2 in this example) in S812.

In S814, the CPU 12 determines whether the attribute of the file to be written indicates "the others are inhibited from reading the file". If the attribute indicates "the others are inhibited from reading the file" (YES in S814), the CPU 12 sets the area identifier of the CPM 44 of the CS flag to a specific area (cpm_addr3 in this example) in S816, and terminates the process.

If the attribute does not indicate that "the others are inhibited from reading the file" (NO in S814), the CPU 12 sets the area identifier of the CPM 44 of the CS flag to a specific area (cpm2 in this example) in S818, and terminates the process.

FIG. 19 is a flowchart showing an example of a CS flag generation process when a read command is issued by the CPU 12 of the host 10. When the flag generation process is started, the CPU 12 determines in S902 whether a partition to be read is a specific partition (a partition HOGE in this example). If the partition to be read is not the partition HOGE (NO in S902), the CPU 12 sets on information or off information of the CS flag to CSS non-starting in S904, and terminates the process.

If the partition to be read is the partition HOGE (YES in S902), the CPU 12 sets the on information or the off information of the CS flag to CSS starting in S906.

In S908, the CPU 12 determines whether the owner of the file to be read is a specific owner (owner FUGA). If the owner of the file to be read is not the owner FUGA (NO in S908), the CPU 12 sets a slot identifier of the CS flag to a certain slot (slot 3 in this example) in S910, sets an area identifier of the CPM 44 of the CS flag to a specific area (cpm_addr1 in this example), and then terminates the process.

If the owner of the file to be read is the owner FUGA (YES in S908), the CPU 12 sets the slot identifier of the CS flag to a certain slot (slot 4 in this example) in S912.

In S914, the CPU 12 determines whether the attribute of the file to be read indicates "the others are inhibited from reading the file". If the attribute indicates "the others are inhibited from reading the file" (YES in S914), the CPU 12 sets the area identifier of the CPM 44 of the CS flag to a specific area (cpm_addr3 in this example) in S916, and terminates the process.

If the attribute does not indicate that "the others are inhibited from reading the file" (NO in S914), the CPU 12 sets the area identifier of the CPM 44 of the CS flag to a specific area (cpm2 in this example) in S918, and terminates the process.

In the sixth embodiment, in the CS flag generation process, the host 10 sets the starting or the non-starting of the CSS 46, the slot identifier at the time of starting, and the CS parameter (the area identifier of the storage area of the CS parameter) at the time of starting to the CS flag, taking into consideration the conditions of the number of a partition to be written, the owner of the file to be written, and the attribute of the file to be written.

FIG. 20 shows an example of the CPM 44 and the CSS 46. Encryption keys A, B, and C are stored in their respective areas cpm1, cpm2, and cpm3 of the CPM 44. The slots 1, 2, 3, and 4 of the CSS 46 correspond to an encryption program of an encryption method 1, an encryption program of an encryption method 2, a decryption program of the encryption method 1 and a decryption program of the encryption method 2, respectively.

According to the sixth embodiment, in accordance with the conditions (the starting or the non-starting of the CSS 46, the slot identifier at the time of starting, and the CS parameter (the area identifier of the storage area of the parameter) at the time of starting) set in the CS flag by the host 10, the encryption process and decryption process of the CSS 46 are performed by the encryption key or the encryption method designated by the CS parameter when data is written to and read from the CS 30.

Seventh Embodiment

The program flow of the CPU 12 of the host 10 and the program flow of the CSS 46 of the CS 30 in the fifth embodiment will be described as a seventh embodiment.

FIG. 21 is a flowchart showing an example of a CS flag generation process when a write command is issued by the CPU 12. When the flag generation process is started, the CPU 12 determines in S1002 whether a partition to be written is a specific partition (a partition HOGE in this example).

If the partition to be written is the partition HOGE (YES in S1002), the CPU 12 sets on information or off information of the CS flag to CSS starting (on) in S1004, and terminates the process.

If the partition to be written is not the partition HOGE (NO in S1002), the CPU 12 sets the on information or the off information of the CS flag to CSS non-starting (off) in S1006, and terminates the process.

FIG. 22 is a flowchart showing an example of a CS flag generation process when a read command is issued by the CPU 12. When the flag generation process is started, the CPU 12 determines in S1102 whether a partition to be read is a specific partition (a partition HOGE in this example).

If the partition to be read is the partition HOGE (YES in S1102), the CPU 12 sets the on information or the off information of the CS flag to CSS starting (on) in S1104, and terminates the process.

If the partition to be read is not the partition HOGE (NO in S1102), the CPU 12 sets the on information or the off information of the CS flag to CSS non-starting (off) in S1106, and terminates the process.

Figure 23:
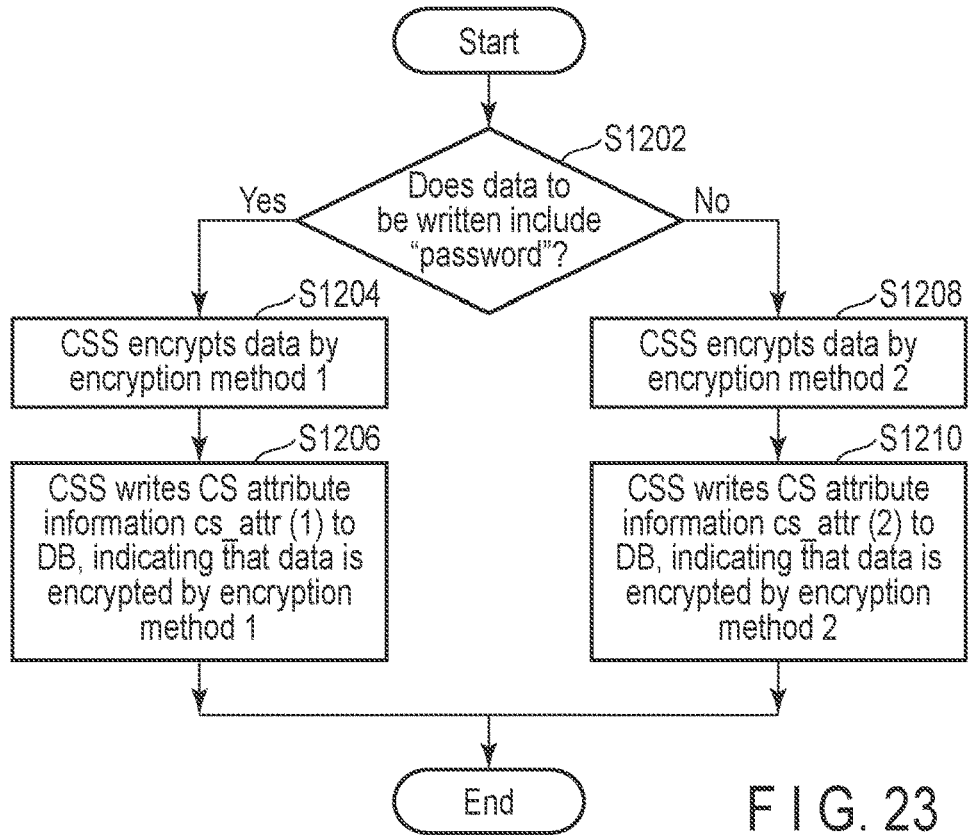
FIG. 23 is a flowchart for explaining a process of the CSS in a write operation according to the seventh embodiment.

FIG. 23 is a flowchart showing a process of the CSS 46 in a write operation. When the CSS 46 in conjunction with the write command is started, it determines in S1202 whether data to be written includes a specific word ("password" in this example).

If the data to be written includes "password" (YES in S1202), the CSS 46 encrypts the data by the encryption method 1 in S1204. In S1206, the CSS 46 writes CS attribute information cs_attr (1), which indicates that the write data is encrypted by the encryption method 1, to the device buffer 42 in S1206. The CS attribute information cs_attr (1) may be transmitted from the device buffer 42 to the NAND memory 32.

If the data to be written does not include "password" (NO in S1202), the CSS 46 encrypts the write data by the encryption method 2 in S1208. In S1210, the CSS 46 writes CS attribute information cs_attr (2), which indicates that the write data is encrypted by the encryption method 2, to the device buffer 42. The CS attribute information cs_attr (2) may be transmitted from the device buffer 42 to the NAND memory 32.

Figure 24:
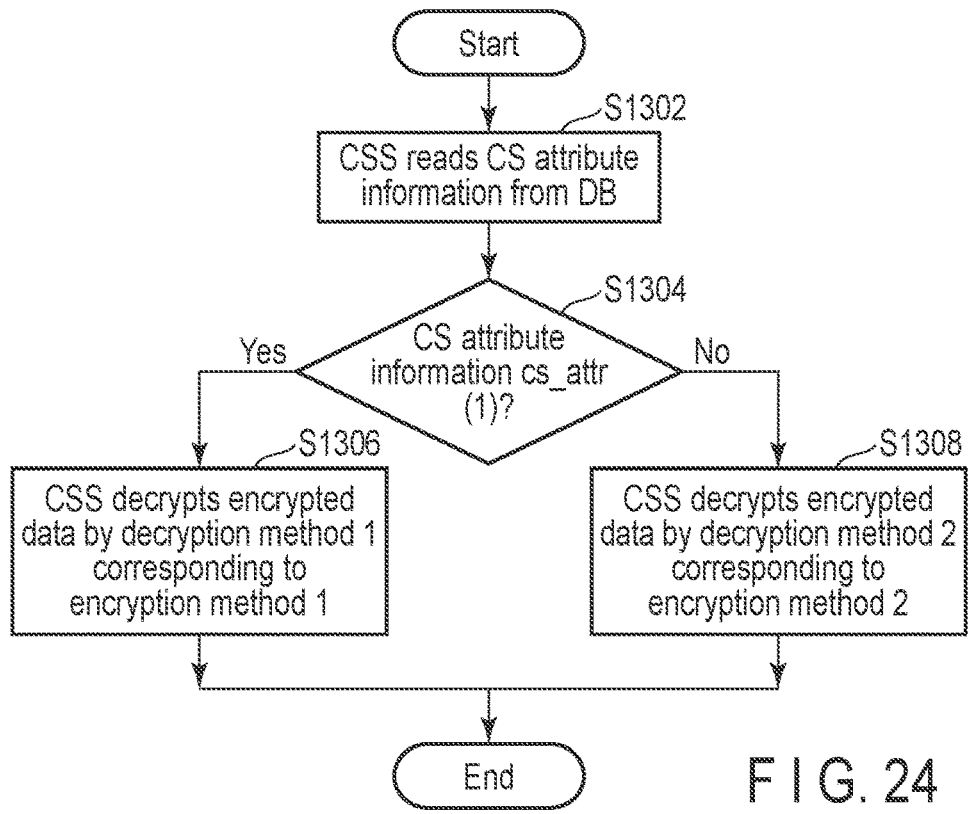
FIG. 24 is a flowchart for explaining a process of the CSS in a read operation according to the seventh embodiment.

FIG. 24 is a flowchart showing a processing of the CSS 46 in a read operation. When the CSS 46 in conjunction with the read command is started, the CSS 46 reads the CS attribute information from the device buffer 42 or the NAND memory 32 in S1302. In S1304, the CSS 46 determines whether the CS attribute information is the CS attribute information cs_attr (1).

If the CS attribute information is the CS attribute information cs_attr (1) (YES in S1304), the CSS 46 decrypts the read encrypted data by the decryption method 1 corresponding to the encryption method 1 in S1306, and terminates the process.

If the CS attribute information is the CS attribute information cs_attr (2) (NO in S1304), the CSS 46 decrypts the read encrypted data by the decryption method 2 corresponding to the encryption method 2 in S1308, and terminates the process.

In the seventh embodiment, in the CS flag generation process, the host 10 designates the starting or the non-starting of the CSS 46 in consideration of the number of a partition to be written.

According to the seventh embodiment, the CSS 46 in conjunction with the write command performs a particular encryption process and the CSS 46 in conjunction with the read command performs a particular decryption process. In the particular encryption process, the CSS 46 in conjunction with the write command confirms the lba data, considers whether a specific character string "password" is included, selects one of the encryption methods, and sets information designating which method is used for the encryption to the CS attribute information. In the particular decryption process, the CSS 46 in conjunction with the read command reads the CS attribute information to perform the decryption process by a method corresponding to the set encryption method. Thus, the host 10 need not manage the CS attribute information, but the host 30 can perform a desired process.

Eighth Embodiment

The program flow of the CPU 12 of the host 10 and the program flow of the CSS 46 of the CS 30 of the third modification of the fifth embodiment will be described as an eighth embodiment.

FIG. 25 is a flowchart showing an example of a CS flag generation process when a write command is issued by the CPU 12. When the flag generation process is started, the CPU 12 determines in S1402 whether a partition to be written is a specific partition (a partition HOGE in this example).

If the partition to be written is not the partition HOGE (NO in S1402), the CPU 12 sets on information or off information of the CS flag to CSS non-starting (off) in S1404, and terminates the process.

If the partition to be written is the partition HOGE (YES in S1402), the CPU 12 sets the on information or the off information of the CS flag to CSS starting (on) in S1406. In S1408, the CPU 12 determines whether the owner of the file to be written is an owner FUGA.

If the owner of the file to be written is not the owner FUGA (NO in S1408), the CPU 12 sets a slot identifier of the CS flag to a certain slot (slot 1 in this example) in S1410, sets a CS parameter of the CS flag to a certain parameter (parameter 1 in this example), and then terminates the process.

If the owner of the file to be written is the owner FUGA (YES in S1408), the CPU 12 sets the slot identifier of the CS flag to a certain slot (slot 2 in this example) in S1412.

In S1414, the CPU 12 determines whether the attribute of the file to be written indicates "the others are inhibited from reading the file". If the attribute indicates "the others are inhibited from reading the file" (YES in S1414), the CPU 12 sets the CS parameter of the CS flag to a certain parameter (parameter 3 in this example) in S1416, and terminates the process.

If the attribute does not indicate that "the others are inhibited from reading the file" (NO in S1414), the CPU 12 sets the CS parameter of the CS flag to a certain parameter (parameter 2 in this example) in S1418, and terminates the process.

FIG. 26 is a flowchart showing an example of a CS flag generation process of the CPU 12 when a read command is issued. When the flag generation process is started, the CPU 12 sets on information or off information of the CS flag to CSS starting (on) and sets a slot identifier to a certain slot (slot 3 in this example) in S1502, and terminates the process.

FIGS. 27A and 27B are flowcharts showing a process of the CSS 46 in a write operation.

FIG. 27A is a flowchart showing a process of the CSS 46 placed in the slot 1. When the CSS 46 in conjunction with a write command in the slot 1 is started, the CSS 46 encrypts data to be written by the encryption method 1 designated by the CS parameter using an encryption key designated by the CS parameter in S1602. In S1604, the CSS 46 sets a CS attribute information read from the CPM 44 to the device buffer 42. The CS attribute information includes a value of the on information or the off information in the CS flag, information indicative of an encryption method, and the CS parameter indicative of a specific area for storing the encryption key. The CS attribute information may be transmitted from the device buffer 42 to the NAND memory 32.

FIG. 27B is a flowchart showing a process of the CSS 46 placed in the slot 2. When the CSS 46 in conjunction with the write command in the slot 2 is started, the CSS 46 encrypts data to be written by the encryption method 2 using an encryption key designated by the CS parameter in S1612. In S1614, the CSS 46 sets a CS attribute information read from the CPM 44 to the device buffer 42. The CS attribute information includes a value of the on information or the off information in the CS flag, information indicative of an encryption method, and the CS parameter indicative of a specific area for storing the encryption key. The CS attribute information may be transmitted from the device buffer 42 to the NAND memory 32.

Figure 28:
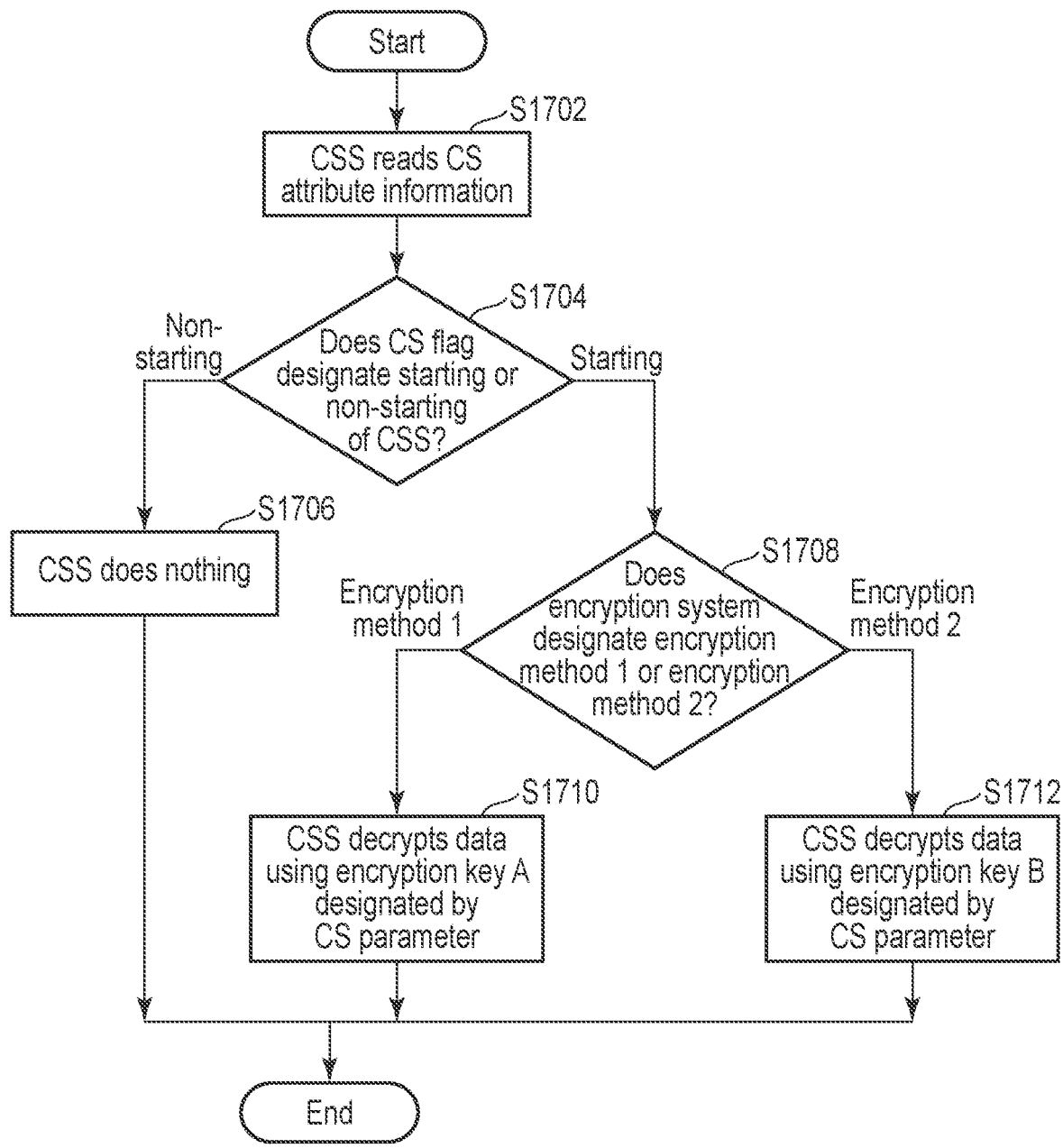
FIG. 28 is a flowchart for explaining a process of the CSS in a read operation according to the eighth embodiment.

FIG. 28 is a flowchart showing a process of the CSS 46 placed in the slot 3 and in conjunction with a read command. When the CSS 46 is started, the CSS 46 reads the CS attribute information in S1702. In S1704, the CSS 46 determines whether the information included in the CS flag in the CS attribute information designates the starting or the non-starting of the CSS 46. When the information included in the CS flag designates the non-starting of the CSS 46, the CSS 46 does nothing (S1706) and terminates the process.

When the CS flag designates the starting of the CSS 46, the CSS 46 determines whether the information indicative of an encryption method among the CS attribute information designates the encryption method 1 or the encryption method 2 in S1708. If the information indicative of an encryption method designates the encryption method 1, the CSS 46 decrypts data using the encryption key A stored in the specific area of the CPM 44 designated by the CS parameter among the CS attribute information in S1710, and terminates the process.

If the information indicative of an encryption method designates the encryption method 2, the CSS 46 decrypts data using the encryption key B stored in the specific area of the CPM 44 designated by the CS parameter among the CS attribute information in S1712, and terminates the process.

Like in the seventh embodiment, in the eighth embodiment, when the host 10 issues a write command, the host 10 designates the starting or the non-starting of the CSS 46, the slot number at the time of starting, and the CS parameter at the time of starting, taking into consideration the conditions of the partition to be written, the owner of the file, the attribute of the file and the like. Unlike in the sixth and seventh embodiments, in the eighth embodiment, when the host 10 issues a read command, the on information or the off information of the CS flag is set to designate the starting of the CSS 46, and program selection information of the CSS flag designates a specific slot number, but no other parameter control is performed.

In the CS attribute information setting process, the CSS 46 of the slots 1 and 2 to be started, in conjunction with the write command, sets the starting of the CSS 46, the encryption method, and the CS parameter. It is assumed here that when the non-starting of the CSS 46 is set, the CS attribute information is in a default state.

The CSS 46 of the slot 3 to be started, in conjunction with the read command branches whether decryption is necessary or not, determines which encryption method is used, and determines which encryption key is used for decryption in accordance with the starting or the non-starting of the CSS 46, using the read CS attribute information (CS flag, encryption key). If the CS 30 uses a value of the CS attribute information, the process of the host 10 can be reduced.

FIG. 29 is a flowchart showing an example of a process of the CSS 46 when the CPU 12 of the host 10 issues a write command in a modification of the eighth embodiment. When the CSS 46 placed in the slot 1, in conjunction with the write command is started, the CSS 46 determines in S1802 whether lba data to be written includes a specific word ("confidential" in this example).

If the lba data to be written includes the word "confidential" (YES in S1802), the CSS 46 encrypts the write data by the encryption method 1 using an encryption key stored in an area of the CPM 44 designated by the CS parameter in S1804. In S1806, the CSS 46 writes CS attribute information cs_attr (A) to the device buffer 42, and terminates the process. The CS attribute information cs_attr (A) includes information indicative of the starting of the CSS 46, the encryption method 1, and the encryption key A.

If the lba data to be written does not include the word "confidential" (NO in S1802), the CSS 46 does not encrypt the write data (S1808), but writes CS attribute information cs_attr (B) including information indicative of the non-starting of the CSS 46 to the device buffer 42 in S1810, and terminates the process.

In the foregoing modification, a process is branched according to the contents of the lba data, which is the same as in the sixth embodiment. After a flow is branched based on the conditions, an operation of overwriting an instruction from the host 10 at the interior of the CSS 46 is performed, as in a non-encryption process (S1808) and a process of setting information to non-starting the CSS 46 in the CS attribute information (S1810).

Even the above operation enables data processing at the time of reading without contradiction because the CSS 46 of the slot 3 of the eighth embodiment shown in FIG. 28 performs a determination process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A computational storage device comprising:
a nonvolatile memory; and
a controller configured to perform a first process in response to a first command and a second process in response to a second command, the first command and the second command being received from an external device, the first process being writing first data designated by the first command to the nonvolatile memory, and the second process being reading second data designated by the second command from the nonvolatile memory and transmitting the read second data to the external device, wherein
the first command includes first information;
the second command includes second information; and
the controller is configured to determine whether to perform a first data process for the first data in the first process in accordance with the first information in the first command and whether to perform a second data process for the read second data in the second process in accordance with the second information in the second command.

2. The computational storage device of claim 1, wherein
the first information is configured to indicate that the controller is caused to perform the first data process or that the controller is not caused to perform the first data process; and
the second information is configured to indicate that the controller is caused to perform the second data process or that the controller is not caused to perform the second data process.

3. The computational storage device of claim 1, wherein
the controller is configured to perform a plurality of data processes;
the plurality of data processes include the first data process and the second data process;
the first information is configured to designate the first data process; and
the second information is configured to designate the second data process.

4. The computational storage device of claim 1, wherein
the first command includes third information designating a first one of a plurality of parameters;
the second command includes fourth information designating a second one of the plurality of parameters;
the controller is configured to perform the first data process using the first one of the parameters designated by the third information; and
the controller is configured to perform the second data process using the second one of the parameters designated by the fourth information.

5. The computational storage device of claim 1, wherein
the controller is configured to perform the first data process based on attribute information;
the controller is configured to write the attribute information to the nonvolatile memory together with the first data in the first process and read the attribute information from the nonvolatile memory together with the written first data as the second data in the second process; and
the controller is configured to perform the second data process based on the read attribute information in the second process.

6. A data processing system comprises a host, and a computational storage device connected to the host, the computational storage device comprising:
a nonvolatile memory; and
a controller configured to receive a first command and a second command from the host, and perform a first process in response to the first command and a second process in response to the second command, the first process being writing first data designated by the first command to the nonvolatile memory, and the second process being reading second data designated by the second command from the nonvolatile memory and transmitting the read second data to the external device, wherein
the first command includes first information;
the second command includes second information; and
the controller is configured to determine whether to perform a first data process for the first data in the first process in accordance with the first information in the first command and whether to perform a second data process for the read second data in the second process in accordance with the second information in the second command.

7. The data processing system of claim 6, wherein
the first information is configured to indicate that the controller is caused to perform the first data process or that the controller is not caused to perform the first data process; and
the second information is configured to indicate that the controller is caused to perform the second data process or that the controller is not caused to perform the second data process.

8. The data processing system of claim 6, wherein
the controller is configured to perform a plurality of data processes;
the plurality of data processes include the first data process and the second data process;
the first information is configured to designate the first data process; and
the second information is configured to designate the second data process.

9. The data processing system of claim 6, wherein
the first command includes third information designating a first one of a plurality of parameters;
the second command includes fourth information designating a second one of the plurality of parameters;
the controller is configured to perform the first data process using the first one of the parameters designated by the third information; and
the controller is configured to perform the second data process using the second one of the parameters designated by the third information.

10. The data processing system of claim 6, wherein
the controller is configured to perform the first data process based on attribute information; and
the controller is configured to write the attribute information to the nonvolatile memory together with the first data in the first process and read the attribute information from the nonvolatile memory together with the written first data as the second data in the second process; and
the controller is configured to perform the second data process based on the read attribute information in the second process.

11. A method for a computational storage device comprising a nonvolatile memory, the method comprising:
receiving a first command including first flag information from an external device;
performing a first process in response to the first command, the first process being writing first data designated by the first command to the nonvolatile memory,
receiving a second command including second flag information from the external device,
performing a second process in response to the second command, the second process being reading second data designated by the second command from the nonvolatile memory and transmitting the read second data to the external device;
determining whether to perform a first data process for the first data in the first process in accordance with the first flag information in the first command; and
determining whether to perform a second data process for the second data in the second process in accordance with the second flag information in the second command.

12. The method of claim 11, wherein
the first flag information is configured to indicate that the first data process is to be performed or not; and
the second flag information is configured to indicate that the second data process is to be performed or not.

13. The method of claim 11, wherein
the first flag information is configured to designate the first data process; and
the second flag information is configured to designate the second data process.

14. The method of claim 11, wherein
the first command includes third flag information designating a third one of a plurality of parameters;
the second command includes fourth flag information designating a second one of the plurality of parameters;
the first data process is performed by using the first one of the parameters designated by the third flag information; and
the second data process is performed by using the second one of the parameters designated by the fourth flag information.

15. The method of claim 11, wherein
the first data process is performed based on attribute information;
the attribute information is written to the nonvolatile memory together with the first data in the first process and the attribute information is read from the nonvolatile memory together with the written first data as the second data in the second process; and the second data process is performed based on the read attribute information in the second process.

* * * * *